(12) United States Patent
Popovici et al.

(10) Patent No.: US 10,153,700 B2
(45) Date of Patent: *Dec. 11, 2018

(54) POWER CONVERTERS

(71) Applicant: O2Micro, Inc., Santa Clara, CA (US)

(72) Inventors: Catalin Popovici, San Jose, CA (US); Alin Gherghescu, San Jose, CA (US); Laszlo Lipcsei, Campbell, CA (US)

(73) Assignee: O2Micro, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,508

(22) Filed: Oct. 24, 2017

(65) Prior Publication Data
US 2018/0062522 A1 Mar. 1, 2018

Related U.S. Application Data

(63) Continuation of application No. 14/470,432, filed on Aug. 27, 2014, now Pat. No. 9,819,271.

(60) Provisional application No. 61/884,556, filed on Sep. 30, 2013.

(51) Int. Cl.
*H02M 1/00* (2006.01)
*H02M 3/28* (2006.01)
*H02M 3/335* (2006.01)

(52) U.S. Cl.
CPC ............. *H02M 3/28* (2013.01); *H02M 3/285* (2013.01); *H02M 3/33569* (2013.01); *H02M 2001/0074* (2013.01)

(58) Field of Classification Search
CPC ........... H02M 2001/0074; H02M 3/28; H02M 3/285; H02M 3/33569
See application file for complete search history.

(56) References Cited

U.S. PATENT DOCUMENTS

| | | | |
|---|---|---|---|
| 4,862,339 A * | 8/1989 | Inou | H02M 1/08 363/21.07 |
| 5,177,675 A | 1/1993 | Archer | |
| 5,365,421 A | 11/1994 | Eastman | |
| 6,269,015 B1 * | 7/2001 | Ikeda | B23K 9/091 219/130.21 |

(Continued)

FOREIGN PATENT DOCUMENTS

| | | |
|---|---|---|
| CN | 1794554 A | 6/2006 |
| CN | 103312174 A | 9/2013 |

(Continued)

*Primary Examiner* — Adolf Berhane
*Assistant Examiner* — Bart Iliya

(57) ABSTRACT

A power converter for converting input power to output power includes a first transformer circuit, a second transformer circuit, and balance circuitry. The first transformer circuit includes a first primary winding for receiving a first part of the input power and a first secondary winding for generating a first part of the output power. The second transformer circuit includes a second primary winding for receiving a second part of the input power and a second secondary winding for generating a second part of the output power. The balance circuitry is coupled to a first terminal of the first secondary winding and a second terminal of the second secondary winding, and operable for balancing the first and second parts of the output power by passing a signal between the first and second terminals. The first and second terminals have the same polarity.

20 Claims, 10 Drawing Sheets

(56) References Cited

U.S. PATENT DOCUMENTS

| | | |
|---|---|---|
| 6,424,544 B1 | 7/2002 | Svardsjo |
| 7,573,000 B2 | 8/2009 | Blankenship et al. |
| 2002/0181253 A1 | 12/2002 | Watanabe |
| 2004/0233685 A1 | 11/2004 | Matsuo |
| 2005/0219865 A1* | 10/2005 | Vogman ............ H02M 3/33569 363/16 |
| 2005/0286277 A1 | 12/2005 | Krein |
| 2006/0119478 A1* | 6/2006 | Karam .................... H04L 12/10 340/538 |
| 2006/0152950 A1 | 7/2006 | Reddy et al. |
| 2007/0001660 A1 | 1/2007 | Gjerde et al. |
| 2007/0159284 A1 | 7/2007 | Chang |
| 2012/0275197 A1 | 11/2012 | Yan et al. |
| 2014/0268889 A1 | 9/2014 | Scott et al. |
| 2014/0268891 A1 | 9/2014 | Sigamani et al. |

FOREIGN PATENT DOCUMENTS

| | | |
|---|---|---|
| FR | 2689704 A1 | 10/1993 |
| TW | 200621408 A | 7/2006 |

\* cited by examiner

POWER CONVERTERS

RELATED APPLICATIONS

This application is a Continuation Application of the commonly-owned U.S. patent application Ser. No. 14/470,432, filed on Aug. 27, 2014, now U.S. Pat. No. 9,819,271, which claims priority to U.S. Provisional Application Ser. No. 61/884,556, filed on Sep. 30, 2013, which are hereby incorporated by reference in their entirety.

BACKGROUND

FIG. 1 shows a block diagram of a conventional DC/DC (direct-current to direct-current) converter 100. The DC/DC converter 100 includes a full-bridge switching circuit 102, a transformer T1, and a rectifying circuit 106. The full-bridge switching circuit 102 includes switches Q1, Q2, Q3 and Q4, and passes input power, e.g., an input voltage $V_{IN}$, to the transformer T1 based on controlling of control signals CTR1, CTR2, CTR3 and CTR4 at the switches Q1, Q2, Q3 and Q4. The transformer T1 receives the input power to generate a primary current $I_{PRI}$ flowing through its primary winding. The primary current $I_{PRI}$ induces a corresponding secondary current $I_{SEC}$ flowing through a secondary winding of the transformer T1. The secondary current $I_{SEC}$ further flows through the rectifying circuit 106 to control an output voltage $V_{OUT}$ of the DC/DC converter 100. Thus, by controlling the switches Q1, Q2, Q3 and Q4, the DC/DC converter 100 can convert an input voltage $V_{IN}$ to a desired output voltage $V_{OUT}$.

As shown in FIG. 1, the control signals CTR1, CTR2, CTR3 and CTR4 can control the switches Q1, Q2, Q3 and Q4 to provide the input power to the transformer T1. The primary current $I_{PRI}$ flows through the transformer T1, and induces magnetic power in the magnetic core of the transformer T1. If the input power is relatively high and causes a relatively large primary current $I_{PRI}$, the magnetic power stored in the magnetic core of the transformer T1 may produce plenty of heat that cannot be dissipated in a short time. As a result, the transformer T1 may have relatively low power conversion efficiency. The power consumption of the DC/DC converter 100 can be quite high; thus, the performance of power conversion is reduced. A power conversion circuit that addresses this shortcoming would be beneficial.

SUMMARY

In one embodiment, a power converter for converting input power to output power includes a first transformer circuit, a second transformer circuit, and balance circuitry. The first transformer circuit includes a first primary winding for receiving a first part of the input power and a first secondary winding for generating a first part of the output power. The second transformer circuit includes a second primary winding for receiving a second part of the input power and a second secondary winding for generating a second part of the output power. The balance circuitry is coupled to a first terminal of the first secondary winding and a second terminal of the second secondary winding, and operable for balancing the first and second parts of the output power by passing a signal between the first and second terminals. The first and second terminals have the same polarity.

In another embodiment, a power converter for converting input power to output power includes a first transformer circuit and a second transformer circuit. The first transformer circuit includes a first primary winding, a first secondary winding, and a first auxiliary winding, and converts a first part of the input power received at the first primary winding to a first part of the output power at the first secondary winding. The first transformer circuit has a first magnetization when converting the first part of the input power to the first part of the output power. The second transformer circuit includes a second primary winding, a second secondary winding, and a second auxiliary winding, and converts a second part of the input power received at the second primary winding to a second part of the output power at the second secondary winding. The second transformer circuit has a second magnetization when converting the second part of the input power to the second part of the output power. The first and second auxiliary windings are coupled to a common node and operable for balancing the first and second magnetizations by passing a signal via the common node.

In yet another embodiment, a power converter includes transformer circuitry, voltage dividing circuitry, and switching circuitry. The transformer circuitry includes a set of primary windings and secondary winding circuitry, and converts input power received at the primary windings to output power at the secondary winding circuitry. The voltage dividing circuitry divides an input voltage of the power converter into a plurality of partial voltages. The switching circuitry is coupled to the transformer circuitry and the voltage dividing circuitry, and operable for controlling each primary winding of the primary windings to selectively receive a partial voltage of the partial voltages.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments according to the present invention provide power converters, e.g., DC/DC (direct-current to direct-current) converters, to convert input power to output power by using transformer circuitry and power transfer circuitry such as full-bridge or half-bridge switching circuitry. The power converter can distribute the input power to multiple primary windings of the transformer circuitry, and one or more secondary windings of the transformer circuitry, combined with the primary windings, can convert the input power to the output power. Thus, even if the input power is relatively high, the power converter can reduce the amount of power provided to each primary winding and can accelerate the heat dissipation of individual magnetic cores in the transformer circuitry.

Furthermore, the power converter includes balance circuitry. By way of example, the transformer circuitry can include multiple secondary windings, and output balance circuitry is coupled to the secondary windings to balance currents respectively flowing through the secondary windings. By way of another example, the transformer circuitry can include multiple transformers, and input balance circuitry is magnetically coupled to the magnetic cores of the transformers to balance magnetizations in the magnetic cores of the transformers. Consequently, a power converter according to the present invention has lower power loss and improved conversion efficiency relative to conventional designs.

Figure 1:
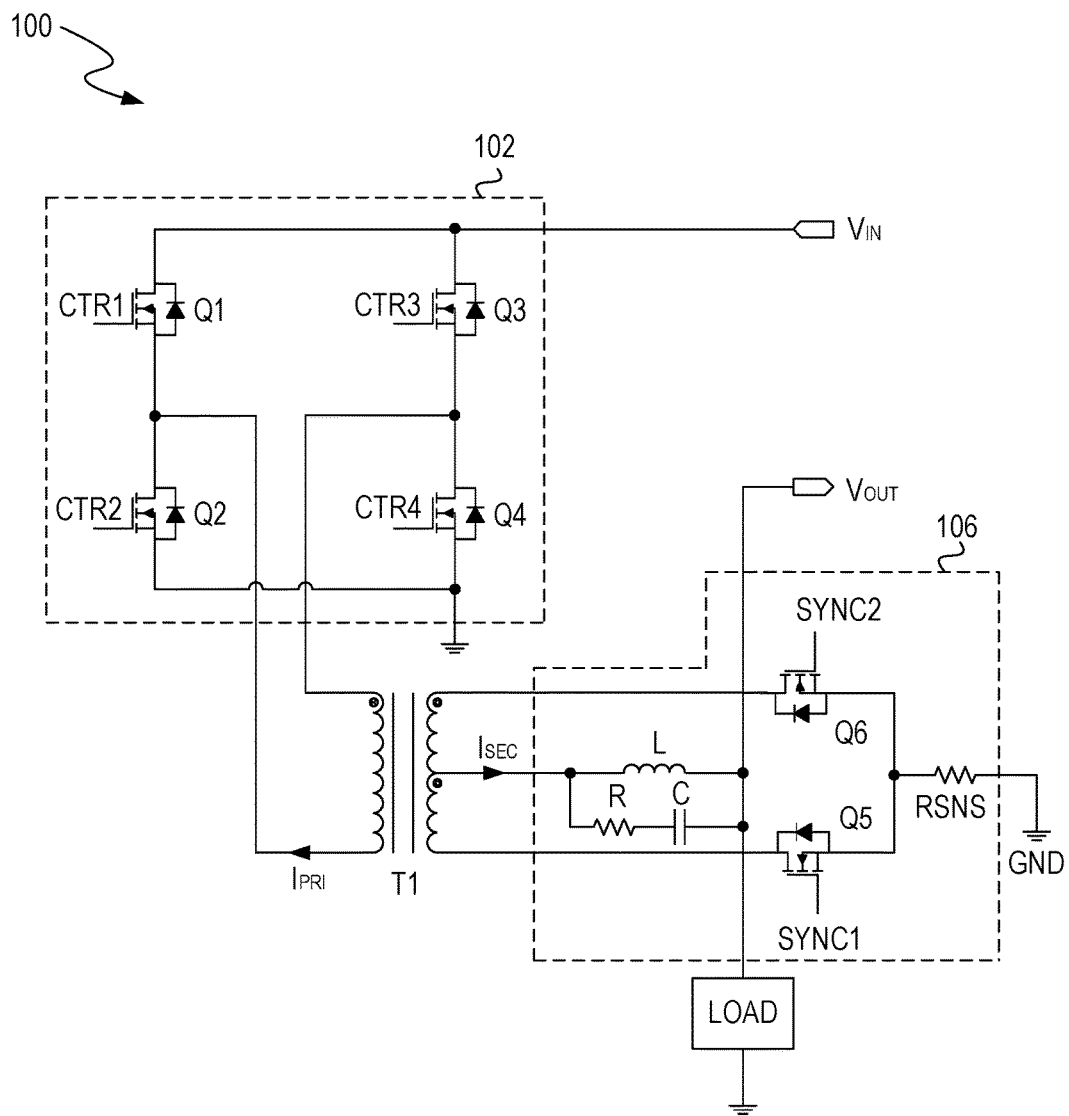
FIG. 1 shows a block diagram of a conventional DC/DC converter.
Figure 2:
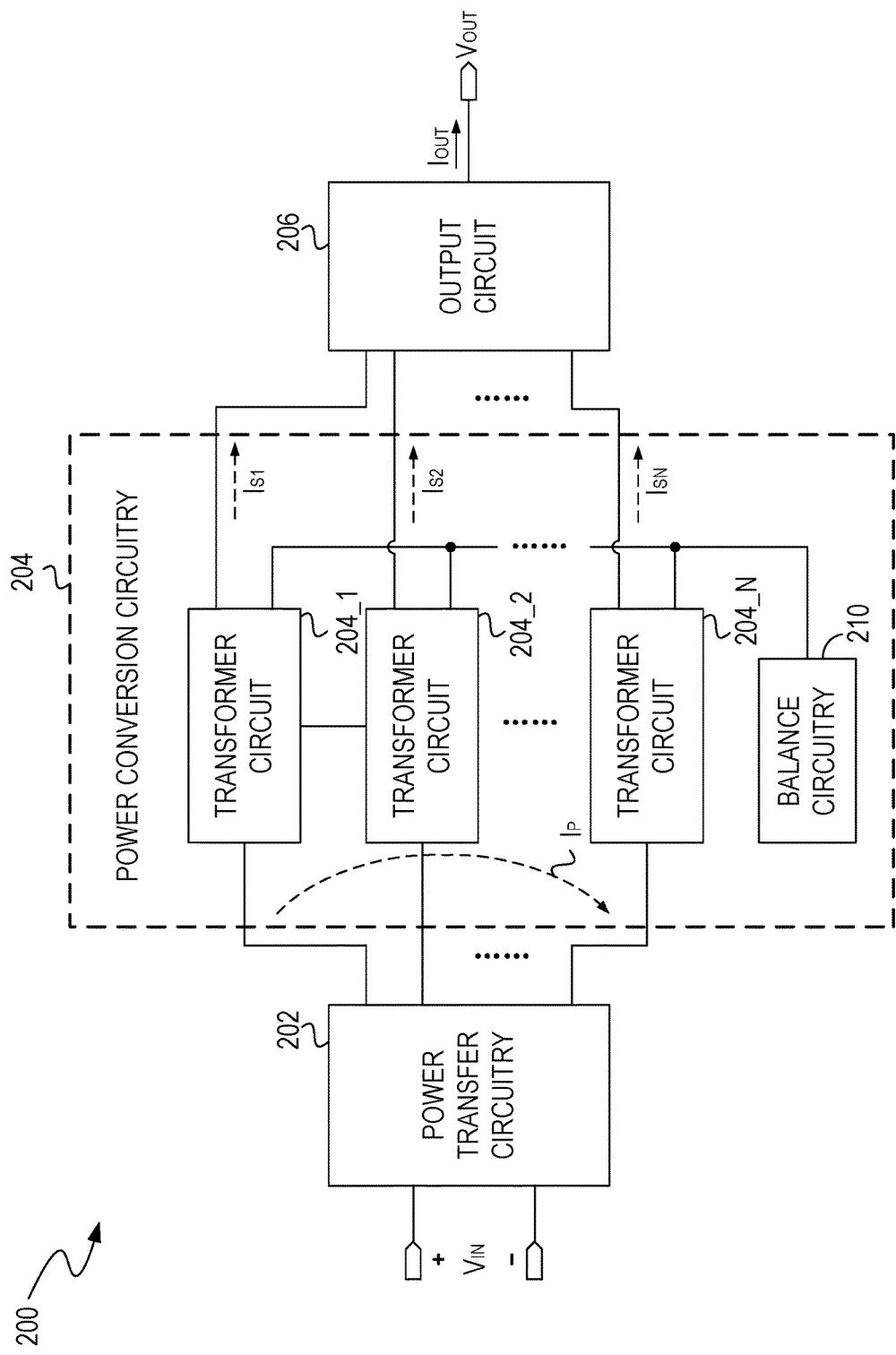
FIG. 2 illustrates a block diagram of an example of a power converter, in an embodiment according to the present invention.

FIG. 2 illustrates a block diagram of an example of a power converter 200, in an embodiment according to the present invention. The power converter 200 can be a transformer-based DC/DC converter (hereinafter, DC/DC converter 200). As shown in FIG. 2, the DC/DC converter 200 includes power transfer circuitry 202, power conversion circuitry 204, and an output circuit 206.

In one embodiment, the power transfer circuitry 202 receives input power, e.g., an input voltage $V_{IN}$, and selectively transfers/delivers the input power to the power conversion circuitry 204. The power conversion circuitry 204 includes balance circuitry 210 and multiple transformer circuits 204_1, 204_2, ..., and 204_N ("N" is a natural number) and is operable for converting the input power to output power. Each transformer circuit 204_1, 204_2, ..., or 204_N includes a primary winding and a secondary winding (not shown). In one embodiment, the primary windings of the transformer circuits 204_1, 204_2, ..., and 204_N are coupled in series, and a primary current $I_P$ flows through the primary windings to distribute the input power to the transformer circuits 204_1, 204_2, ..., and 204_N. Advantageously, given a same amount of input power, the heat produced by the magnetic core in each transformer circuit of the DC/DC converter 200 can be reduced, compared with that in the conventional DC/DC converter 100. Thus, the efficiency of heat dissipation of the transformer circuits 204_1, 204_2, ..., and 204_N in FIG. 2 can be improved. In other words, by using multiple transformer circuits, the DC/DC converter 200 will experience lower power loss and higher conversion efficiency with larger input power/voltage, compared with the conventional DC/DC converter 100. Additionally, in one embodiment, the secondary windings of the transformer circuits 204_1, 204_2, ..., and 204_N can be coupled in parallel, and secondary currents $I_{S1}$, $I_{S2}$, ..., and $I_{SN}$, respectively flowing through the secondary windings of the transformer circuits 204_1, 204_2, ..., and 204_N, can be combined to form an output current $I_{OUT}$ at the output circuit 206 to control an output voltage $V_{OUT}$ of the DC/DC converter 200. Thus, the DC/DC converter 200 can convert an input voltage $V_{IN}$ to an output voltage $V_{OUT}$.

In one embodiment, the balance circuitry 210 balances power conversion in the transformer circuits 204_1-204_N. For example, the balance circuitry 210 can be magnetically coupled to the magnetic cores of the transformer circuits 204_1-204_N to balance magnetizations in the magnetic cores of the transformer circuits 204_1-204_N. For another example, the balance circuitry 210 can be coupled to the secondary windings of the transformer circuits 204_1-204_N to balance the secondary currents $I_{S1}$, $I_{S2}$, ..., and $I_{SN}$. As used herein, "balance" a first element and a second element means reducing a difference between the first element and the second element. The first and second elements can be voltages, currents, input power, output power, magnetizations, magnetic energy, etc.

Figure 3:
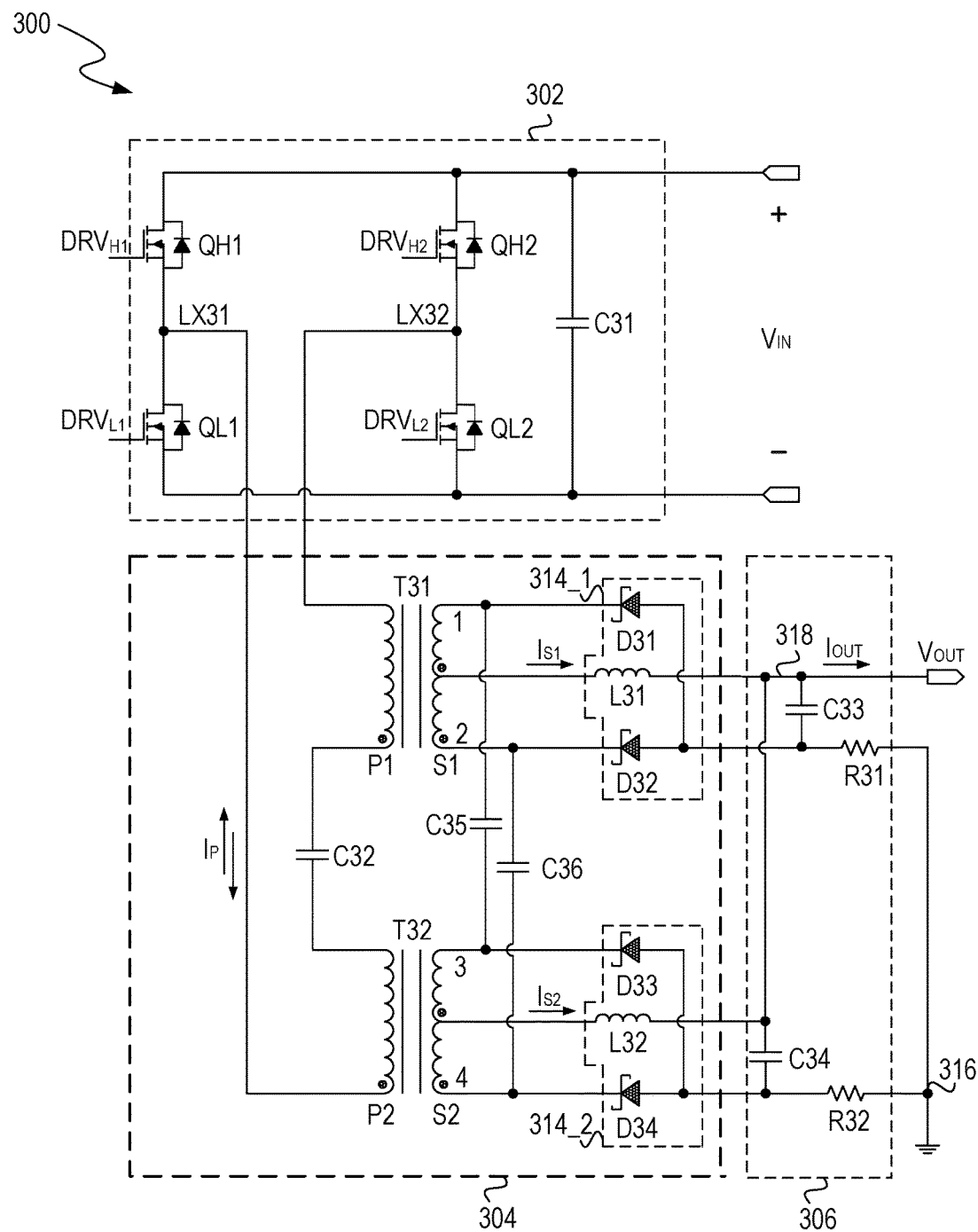
FIG. 3 illustrates a circuit diagram of an example of a power converter, in an embodiment according to the present invention.

FIG. 3 illustrates a circuit diagram of an example of a DC/DC converter 300, in an embodiment according to the present invention. FIG. 3 is described in combination with FIG. 2. The DC/DC converter 300 can be one embodiment of the DC/DC converter 200 in FIG. 2. The DC/DC converter 300 includes power transfer circuitry 302, power conversion circuitry 304, and an output circuit 306.

In one embodiment, the power transfer circuitry 302 includes a switching circuit such as a full-bridge switching circuit including switches QH1, QL1, QH2 and QL2 disclosed in the example of FIG. 3 or a half-bridge switching circuit (not shown). The switching circuit can selectively transfer/deliver input power, e.g., an input voltage $V_{IN}$, to the power conversion circuitry 304. By way of example, the switches QH1, QL1, QH2 and QL2, under control of control signals $DRV_{H1}$, $DRV_{L1}$, $DRV_{H2}$ and $DRV_{L2}$, can alternate among a first mode, a second mode, a third mode, and a fourth mode. In the first mode, the control signals $DRV_{H1}$, $DRV_{L1}$, $DRV_{H2}$ and $DRV_{L2}$ can turn on the switches QH1 and QL2 and turn off the switches QL1 and QH2. Hence, the power conversion circuitry 304 receives input power, e.g., the input voltage $V_{IN}$, through the switches QH1 and QL2. In the second mode, the control signals $DRV_{L1}$, $DRV_{L1}$, $DRV_{H2}$ and $DRV_{L2}$ can turn on the switches QH1 and QH2, and turn off the switches QL1 and QL2. Hence, the power conversion circuitry 304 does not receive input power. In the third mode, the control signals $DRV_{L1}$, $DRV_{L1}$, $DRV_{H2}$ and $DRV_{L2}$ can turn on the switches QL1 and QH2 and turn off the switches QH1 and QL2. Hence, the power conversion circuitry 304 receives input power, e.g., the input voltage $V_{IN}$, through the switches QL1 and QH2. In the fourth mode, the control signals $DRV_{H1}$, $DRV_{L1}$, $DRV_{H2}$ and $DRV_{L2}$ can turn on the switches QL1 and QL2, and turn off the switches QH1 and QH2. Hence, the power conversion circuitry 304 does not receive input power. However, this invention is not so limited. In another embodiment, during the second mode and the fourth mode, the control signals $DRV_{H1}$, $DRV_{H2}$, $DRV_{L1}$ and $DRV_{L2}$ can turn off the switches QH1, QL1, QH2 and QL2.

In one embodiment, the power conversion circuitry 304 includes a first transformer circuit T31, a second transformer circuit T32, a capacitor C32, and rectifier circuits 314_1 and 314_2. The first transformer circuit T31 includes a first primary winding P1 and a first secondary winding S1, e.g., a center-tapped secondary winding. The second transformer circuit T32 includes a second primary winding P2 and a second secondary winding S2, e.g., a center-tapped secondary winding. In one embodiment, the transformer circuits T31 and T32 are substantially identical. In one embodiment, the rectifier circuits 314_1 and 314_2 are also substantially identical. As used herein, a first circuit and a second circuit that are "substantially identical" are manufactured to have the same characteristics but differences may exist between them due to, e.g., the non-ideality of the manufacturing process, and the differences are permissible as long as the differences are in a range that can be neglected. In the embodiment of FIG. 3, the rectifier circuits 314_1 and 314_2 are coupled to the secondary windings S1 and S2, respectively, and have a structure of half-bridge rectifier. However, this invention is not so limited. In other embodiments, the rectifier circuits 314_1 and 314_2 can use another type of structure, e.g., a structure of the full-bridge rectifier circuit 414B in FIG. 5B, to provide similar functions. Referring to FIG. 3, the primary windings P1 and P2 are coupled in series, and the secondary windings S1 and S2 are coupled in parallel. The capacitor C32 is coupled between the primary windings P1 and P2 to avoid core saturation caused by a primary current $I_P$ flowing through the primary windings P1 and P2. Although FIG. 3 discloses two transformer circuits and two rectifier circuits, in another embodiment, more than two transformer circuits and corresponding rectifier circuits can be applied using similar structures.

In operation, in one embodiment, by alternating among the abovementioned first, second, third, and fourth modes, the power transfer circuitry 302 controls the power conversion circuitry 304 to convert an input voltage $V_{IN}$ to an output voltage $V_{OUT}$. By way of example, as mentioned above, in the first mode, the power conversion circuitry 304 receives input power, e.g., the input voltage $V_{IN}$, through the switches QH1 and QL2, and therefore a primary current $I_P$ is generated to flow through the primary windings P1 and P2. In response to the primary current $I_P$, a secondary current $I_{S1}$ can be generated in the secondary winding S1 and a secondary current $I_{S2}$ can be generated in the secondary winding S2. The secondary currents $I_{S1}$ and $I_{S2}$ can increase during the first mode because the power conversion circuitry 304 receives input power. In the second mode, the power conversion circuitry 304 does not receive input power. Accordingly, the secondary currents $I_{S1}$ and $I_{S2}$ can decrease during the second mode. Similarly, in the third mode, the power conversion circuitry 304 receives input power through the switches QL1 and QH2. Accordingly, the secondary currents $I_{S1}$ and $I_{S2}$ can increase during the third mode. In the fourth mode, the power conversion circuitry 304 does not receive input power. Accordingly, the secondary currents $I_{S1}$ and $I_{S2}$ can decrease during the fourth mode.

The secondary currents $I_{S1}$ and $I_{S2}$ can pass through the rectifier circuits 314_1 and 314_2 and be combined to form an output current $I_{OUT}$, e.g., $I_{OUT}=I_{S1}+I_{S2}$, at the output circuit 306. The output current $I_{OUT}$ can control an output voltage $V_{OUT}$ of the DC/DC converter 300.

Thus, in one embodiment, the primary winding P1 can receive a first part of input power of the DC/DC converter 300, e.g., represented by the primary current $I_P$ multiplied by a voltage across the primary winding P1. The secondary winding S1 can generate a first part of output power of the DC/DC converter 300, e.g., represented by the secondary current $I_{S1}$ multiplied by the output voltage $V_{OUT}$ of the DC/DC converter 300. The primary winding P2 can receive a second part of the input power, e.g., represented by the primary current $I_P$ multiplied by a voltage across the primary winding P2. The secondary winding S2 can generate a second part of the output power, e.g., represented by the secondary current $I_{S2}$ multiplied by the output voltage $V_{OUT}$.

Advantageously, the input power of the DC/DC converter 300 can be distributed to multiple transformer circuits such as the circuits T31 and T32 with their primary windings coupled in series. Thus, given a same amount of input power, the distributed power on each primary winding of the transformer circuits can be decreased compared with conventional designs, and the heat produced on each magnetic core of the transformer circuits can be lessened so as to improve the efficiency of heat dissipation on the transformer circuits. Consequently, the DC/DC converter 300 can endure larger input power/voltage with lower power loss and higher conversion efficiency, compared with the conventional DC/DC converter 100.

Additionally, in one embodiment, the rectifier circuit 314_1 is configured to rectify the secondary current $I_{S1}$ such that the secondary current $I_{S1}$ flows in only the direction from the secondary winding S1 to an output terminal (e.g., labeled $V_{OUT}$) of the DC/DC converter 300. The rectifier circuit 314_2 is configured to rectify the secondary current $I_{S2}$ such that the secondary current $I_{S2}$ flows in only the direction from the secondary winding S2 to the output terminal of the DC/DC converter 300.

By way of example, as shown in FIG. 3, the rectifier circuit 314_1 includes rectifying diodes D31 and D32, and an inductor L31; and the rectifier circuit 314_2 includes rectifying diodes D33 and D34, and an inductor L32. In one embodiment, in the abovementioned first mode, the rectifying diode D31 is turned on and allows a secondary current $I_{S1}$ to flow through the rectifying diode D31, the upper section (e.g., near a terminal label "1") of the center-tapped secondary winding S1 (shown in FIG. 3), and the inductor L31, from a first node 316, e.g., a ground terminal of the DC/DC converter 300, to a second node 318, e.g., the output terminal of the DC/DC converter 300, and meanwhile the inductor L31 can store magnetic energy. Similarly, the rectifying diode D33 is turned on and allows a secondary current $I_{S2}$ to flow through the rectifying diode D33, the upper section (e.g., near a terminal label "3") of the center-tapped secondary winding S2, and the inductor L32, from the first node 316 to the second node 318, and meanwhile the inductor L32 can store magnetic energy. Additionally, in the first mode, the rectifying diodes D32 and D34 are turned off. In the abovementioned second mode, the inductor L31 releases magnetic energy, and the rectifying diodes D31 and D32 are turned on to allow currents to flow through the rectifying diodes D31 and D32 and the upper and lower sections of the center-tapped secondary winding S1 from the first node 316 to the second node 318. The currents through the rectifying diodes D31 and D32 are combined at the inductor L31 to form a secondary current $I_{S1}$ of the transformer circuit T31. Similarly, the inductor L32 releases magnetic energy, and the rectifying diodes D33 and D34 are turned on to allow currents to flow through the rectifying diodes D33 and D34 and the upper and lower sections of the center-tapped secondary winding S2 from the first node 316 to the second node 318. The currents through the rectifying diodes D33 and D34 are combined at the inductor L32 to form a secondary current $I_{S2}$ of the transformer circuit T32. In the abovementioned third mode, the rectifying diode D32 is turned on and allows a secondary current $I_{S1}$ to flow through the rectifying diode D32, the lower section (e.g., near a terminal label "2") of the center-tapped secondary winding S1, and the inductor L31, from the first node 316 to the second node 318, and meanwhile the inductor L31 can store magnetic energy. Similarly, the rectifying diode D34 is turned on and allows a secondary current $I_{S2}$ to flow through the rectifying diode D34, the lower section (e.g., near a terminal label "4") of the center-tapped secondary winding S2, and the inductor L32, from the first node 316 to the second node 318, and meanwhile the inductor L32 can store magnetic energy. Additionally, in the third mode, the rectifying diodes D31 and D33 are turned off. In the abovementioned fourth mode, the inductor L31 releases magnetic energy, and the rectifying diodes D31 and D32 are turned on to allow currents to flow through the rectifying diodes D31 and D32 and the upper and lower sections of the center-tapped secondary winding S1 from the first node 316 to the second node 318. The currents through the rectifying diodes D31 and D32 are combined at the inductor L31 to form a secondary current $I_{S1}$ of the transformer circuit T31. Similarly, the inductor L32 releases magnetic energy, and the rectifying diodes D33 and D34 are turned on to allow currents to flow through the rectifying diodes D33 and D34 and the upper and lower sections of the center-tapped secondary winding S2 from the first node 316 to the second node 318. The currents through the rectifying diodes D33 and D34 are combined at the inductor L32 to form a secondary current $I_{S2}$ of the transformer circuit T32.

As described above, the rectifying diodes D31, D32, D33 and D34 can respectively pass currents from the same first node 316 to the same second node 318. Thus, in one embodiment, the rectifying diodes D31, D32, D33 and D34 are coupled in parallel. However, when two diodes are coupled in parallel, imbalance between the voltage drops across the diodes may cause one diode to be forward-biased, e.g., turned on, so that it conducts all the current and the other diode to remain cut-off. Thus, if voltage imbalance exists among the rectifying diodes D31, D32, D33 and D34, then the secondary currents $I_{S1}$ and $I_{S2}$ may be imbalanced, which causes imbalance between the abovementioned first part of the output power (e.g., represented by $V_{OUT}*I_{S1}$) generated by the secondary winding S1 and the abovementioned second part of the output power (e.g., represented by $V_{OUT}*I_{S2}$) generated by the secondary winding S2. If not addressed in the design, an imbalance between the first and second parts of the output power may cause instability in the output power of the DC/DC converter 300 and reduce the conversion efficiency of the DC/DC converter 300. Advantageously, in one embodiment, the power conversion circuitry 304 includes balance circuitry having capacitive components C35 and C36, e.g., capacitors, to balance the first and second parts of the output power.

To be more specific, in one embodiment, the secondary winding of each transformer circuit T31 or T32 may include parasitic inductance (e.g., referred to as leakage inductance) and parasitic capacitance, which constitute a resonant circuit. The resonant circuit may cause voltage ringing on the secondary windings S1 and S2, and the amplitude and frequency of the voltage ringing can be relatively high if the power on the primary windings P1 and P2 changes abruptly, e.g., when the power transfer circuitry 302 switches from a mode to another mode, e.g., among the abovementioned first, second, third and fourth modes. In one embodiment, differences may exist between the parasitic elements in the secondary windings S1 and S2, which can cause differences between the voltage ringing on the secondary windings S1 and S2. Consequently, unless addressed in the design, an imbalance may exist between transient voltages at the terminals "1" and "3" and between transient voltages at the terminals "2" and "4." This can cause voltage imbalance of the rectifying diodes D31, D32, D33 and D34, which further causes overload, e.g., a high energy pulse, on one or two diodes of the rectifying diodes D31, D32, D33 and D34. In consequence, the secondary currents $I_{S1}$ and $I_{S2}$ may be imbalanced if a difference in voltage ringing exists between the secondary windings.

As shown in FIG. 3, the capacitive component C35 has a first end coupled to a terminal labeled "1" of the secondary winding S1, and has a second end coupled to a terminal labeled "3" of the secondary winding S2. The terminal "1" and the terminal "3" have the same polarity. Hence, the capacitive component C35 can function as a signal filter that passes a signal, e.g., voltage ringing, between the terminals "1" and "3" to reduce voltage imbalance of the rectifying diodes D31 and D33, so as to balance the secondary currents $I_{S1}$ and $I_{S2}$. In other words, the capacitive component C35 is operable for balancing the first part of the output power (e.g., represented by $V_{OUT}*I_{S1}$) and the second part of the output power (e.g., represented by $V_{OUT}*I_{S2}$) by passing a signal, e.g., voltage ringing, between the terminal "1" and the terminal "3." Similarly, the capacitive component C36 has a first end coupled to a terminal labeled "2" of the secondary winding S1, and has a second end coupled to a terminal labeled "4" of the secondary winding S2. The terminal "2" and the terminal "4" have the same polarity. Hence, the capacitive component C36 can function as a signal filter that passes a signal, e.g., voltage ringing, between the terminals "2" and "4" to reduce voltage imbalance of the rectifying diodes D32 and D34, so as to balance the secondary currents $I_{S1}$ and $I_{S2}$. In other words, the capacitive component C36 is operable for balancing the first part of the output power (e.g., represented by $V_{OUT}*I_{S1}$) and the second part of the output power (e.g., represented by $V_{OUT}*I_{S2}$) by passing a signal, e.g., voltage ringing, between the terminal "2" and the terminal "4." Consequently, the secondary currents $I_{S1}$ and $I_{S2}$ can be balanced, e.g., synchronized to have uniform waveforms, and the first and second parts of the output power can be balanced. The output power of the DC/DC converter 300 can be stabilized and the conversion efficiency of the DC/DC converter 300 can be enhanced.

As used herein, "the same polarity" means that if a primary current $I_P$ flowing through the primary windings P1 and P2 induces a current flowing into a first terminal of the secondary winding S1 and a current flowing into a second terminal of the secondary winding S2, then the first and second terminals have the "same polarity." Similarly, if a primary current $I_P$ flowing through the primary windings P1 and P2 induces a current flowing out from a third terminal of the secondary winding S1 and a current flowing out from a fourth terminal of the secondary winding S2, then the third and fourth terminals have the "same polarity." Taking FIG. 3 for example, the terminals "1" and "3" are non-dotted terminals of the secondary windings S1 and S2 and have the same polarity; and the terminals "2" and "4" are dotted terminals of the secondary windings S1 and S2 and have the same polarity. As used herein, a "dotted terminal" means a terminal of a winding of a transformer, e.g., a primary winding or a secondary winding, that is marked with a dot "•" shown in a figure of an embodiment according to the present invention, and a "non-dotted terminal" means another terminal of the winding, that has different polarity from the dotted terminal.

In one embodiment, the output circuit 306 for providing the output power of the DC/DC converter 300 includes capacitors C33 and C34 to function as output filters, and includes resistive components R31 and R32, e.g., resistors, to provide negative feedback to further improve the balance between the secondary currents $I_{S1}$ and $I_{S2}$. More specifically, in one embodiment, the rectifying diodes D31, D32, D33 and D34 have negative thermal coefficients. For example, the larger the current flowing through a diode (e.g., D31, D32, D33 or D34), the higher the temperature of the diode and the lower the voltage drop across the diode. This may, over time and unless addressed, increase an existing imbalance between the voltage drops across the rectifying diodes D31, D32, D33 and D34 and an imbalance between the secondary currents $I_{S1}$ and $I_{S2}$. In one embodiment, the resistive components R31 and R32 are included to suppress these imbalances.

To be more specific, in one embodiment, the resistive component R31 is coupled to the rectifying diodes D31 and D32, and operable for passing at least a part of the secondary current $I_{S1}$ to provide a negative feedback to the secondary current $I_{S1}$. For example, a minor part of the secondary current $I_{S1}$ may flow through the capacitor C33, and a main part of the secondary current $I_{S1}$ may flow through the resistive component R31. In one embodiment, the resistive components R31 and R32 have substantially the same resistances. As used herein, "substantially the same resistances" means that the resistive components R31 and R32 are manufactured to have the same resistance, and a negligible difference may exist between their resistances because of non-ideality of the manufacturing process. Thus, if the secondary current $I_{S1}$ is greater than the secondary current $I_{S2}$, then a voltage across the resistive component R31 can be greater than a voltage across the resistive component R32, and therefore a voltage across the inductor L31 and the secondary winding S1 can be less than a voltage across the inductor L32 and the secondary winding of the transformer circuit T32, which in turn can reduce the secondary current $I_{S1}$ toward the secondary current $I_{S2}$. If the secondary current $I_{S1}$ is less than the secondary current $I_{S2}$, then a voltage across the resistive component R31 can be less than a voltage across the resistive component R32, and therefore a voltage across the inductor L31 and the secondary winding S1 can be greater than a voltage across the inductor L32 and the secondary winding of the transformer circuit T32, which in turn can increase the secondary current $I_{S1}$. Similarly, the resistive component R32 is coupled to the rectifying diodes D33 and D34, and is operable for passing at least a part of the secondary current $I_{S2}$ to provide a negative feedback to the secondary current $I_{S2}$. Hence, the resistive components R31 and R32 can reduce a difference between the secondary currents $I_{S1}$ and $I_{S2}$, as well as differences between the voltage drops across the rectifying diodes D31, D32, D33 and D34.

Figure 4:
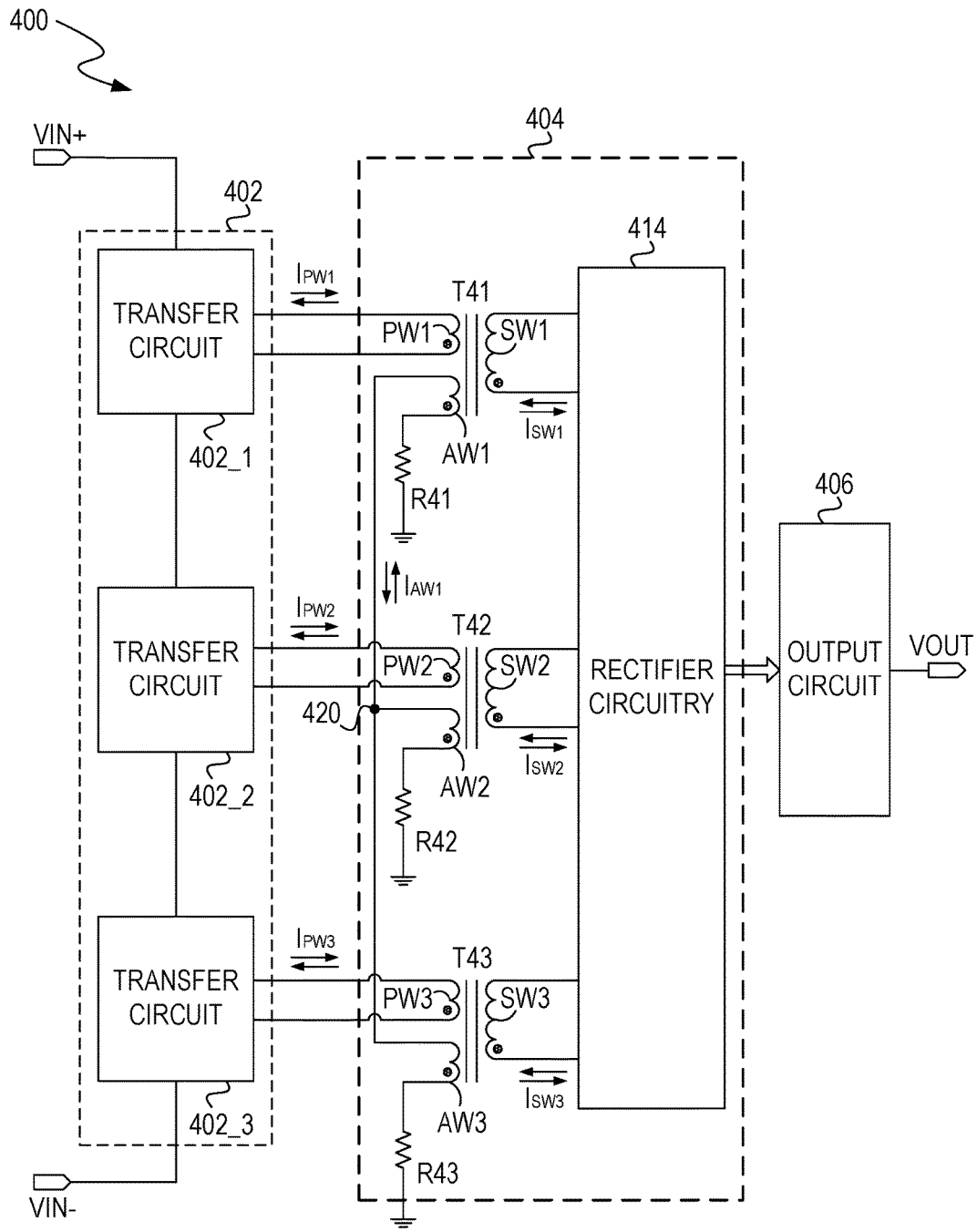
FIG. 4 illustrates a block diagram of an example of a power converter, in another embodiment according to the present invention.

FIG. 4 illustrates a block diagram of an example of a power converter 400, in an embodiment according to the present invention. The DC/DC converter 400 can be one embodiment of the DC/DC converter 200 in FIG. 2. The DC/DC converter 400 includes power transfer circuitry 402, power conversion circuitry 404, and an output circuit 406, and is operable for converting input power received from terminals VIN+ and VIN− to output power at a terminal VOUT.

As shown in FIG. 4, the power transfer circuitry 402 includes multiple transfer circuits 402_1, 402_2 and 402_3 coupled in series. The power conversion circuitry 404 includes a first transformer circuit T41, a second transformer circuit T42, a third transformer circuit T43, and rectifier circuitry 414. Each transformer circuit T41, T42 or T43 includes a primary winding PW1, PW2, or PW3 coupled to a corresponding transfer circuit 402_1, 402_2, or 402_3, and a secondary winding SW1, SW2 or SW3 coupled to the rectifier circuitry 414. Each transformer circuit T41, T42 or T43 also includes an auxiliary winding (or an additional winding) AW1, AW2 or AW3, and a current limiting component R41, R42 or R43, e.g., a resistor, coupled in series with the auxiliary winding. In one embodiment, the auxiliary windings AW1, AW2 and AW3 are coupled between a common node 420 and ground via the current limiting components R41, R42 and R43, respectively. The current limiting components R41, R42 and R43 can control currents flowing through the auxiliary windings AW1, AW2 and AW3 to be within a range, respectively.

In one embodiment, the power transfer circuitry 402 receives input power from the terminals VIN+ and VIN−, and the transfer circuits 402_1, 402_2 and 402_3 divide the input power into multiple parts/fractions. The transfer circuit 402_1 transfers a first part of the input power to the primary winding PW1 to cause a primary current $I_{PW1}$ flowing through the primary winding PW1, the transfer circuit 402_2 transfers a second part of the input power to the primary winding PW2 to cause a primary current $I_{PW2}$ flowing through the primary winding PW2, and the transfer circuit 402_3 transfers a third part of the input power to the primary winding PW3 to cause a primary current $I_{PW3}$ flowing through the primary winding PW3. The primary current $I_{PW1}$ induces a secondary current $I_{SW1}$ flowing through the secondary winding SW1, the primary current $I_{PW2}$ induces a secondary current $I_{SW2}$ flowing through the secondary winding SW2, and the primary current $I_{PW3}$ induces a secondary current $I_{SW3}$ flowing through the secondary winding SW3. Thus, the transformer circuit T41 converts the first part of the input power received at the primary winding PW1, e.g., represented by the primary current $I_{PW1}$, to a first part of the output power at the secondary winding SW1, e.g., represented by the secondary current $I_{SW1}$, the transformer circuit T42 converts the second part of the input power received at the primary winding PW2, e.g., represented by the primary current $I_{PW2}$, to a second part of the output power at the secondary winding SW2, e.g., represented by the secondary current $I_{SW2}$, and the transformer circuit T43 converts the third part of the input power received at the primary winding PW3, e.g., represented by the primary current $I_{PW3}$, to a third part of the output power at the secondary winding SW3, e.g., represented by the secondary current $I_{SW3}$. The secondary currents $I_{SW1}$, $I_{SW2}$, and $I_{SW3}$ further flow through the rectifier circuitry 414 and the output circuit 406, and are combined at the output terminal VOUT to form the output power of the DC/DC converter 400. Thus, the input power of the DC/DC converter 400 can be distributed by the transfer circuits 402_1, 402_2 and 402_3, and each transformer circuit T41, T42 or T43 can convert a fraction of the input power to a fraction of the output power. Advantageously, heat produced by the power conversion can be distributed on the transformer circuits T41, T42 and T43, and therefore the rate of heat dissipation from the transformer circuits can be increased.

In one embodiment, the transformer circuits T41, T42 and T43 are substantially identical. As used herein, "substantially identical" means that the transformer circuits T41, T42 and T43 are manufactured to have the same characteristics (e.g., including the primary winding, the auxiliary winding, the current limiting component coupled in series with the auxiliary winding, and the secondary winding) but a difference may exist between their characteristics due to, e.g., non-ideality of the manufacturing process. The difference is permissible as long as the difference is in a range that can be neglected. Thus, the primary windings PW1, PW2 and PW3 have the same turn number, the auxiliary windings AW1, AW2 and AW3 have the same turn number, the current limiting components R41, R42 and R43 have substantially the same resistance, and the secondary windings SW1, SW2 and SW3 have the same turn number. In an ideal situation, when the transformer circuits T41, T42 and T43 perform power conversion, the primary windings PW1, PW2 and PW3 can receive the same amount of input power, the magnetic cores of the transformer circuits T41, T42 and T43 can have the same magnetization, and the secondary windings SW1, SW2 and SW3 can generate the same amount of output power. However, in a practical situation, the amounts of power provided to the primary windings PW1, PW2 and PW3 may not be exactly the same because of, e.g., non-ideality of circuit components and/or non-ideal controlling of the transfer circuits 402_1, 402_2 and 402_3. If not addressed in the design, this can result in imbalance of the magnetizations in the magnetic cores of the transformer circuits T41, T42 and T43. Advantageously, in one embodiment, the auxiliary windings AW1, AW2 and AW3 provide negative feedback to balance the magnetizations in the magnetic cores of the transformer circuits T41, T42 and T43.

More specifically, in one embodiment, the transformer circuits T41, T42 and T43 perform power conversion simultaneously. That is, during a same period, the transformer circuit T41 converts a first part of the input power of the DC/DC converter 400 to a first part of the output power of the DC/DC converter 400, the transformer circuit T42 converts a second part of the input power to a second part of the output power, and the transformer circuit T43 converts a third part of the input power to a third part of the output power. The transformer circuit T41 can have a first magnetization M1 when converting the first part of the input power to the first part of the output power, the transformer circuit T42 can have a second magnetization M2 when converting the second part of the input power to the second part of the output power, and the transformer circuit T43 can have a third magnetization M3 when converting the third part of the input power to the third part of the output power. In one embodiment, a magnetization M can be given by: M=$\chi$*H, where $\chi$ represents a magnetic susceptibility determined by the materials that the transformer circuit is made of, and H represents a magnetic field intensity of the transformer circuit. In one embodiment, a magnetization, similar to a magnetic field intensity, of the transformer circuit T41 is mainly determined by a primary current $I_{PW1}$ flowing through the primary winding PW1 and also influenced by a secondary current $I_{SW1}$ flowing through the secondary winding SW1 and a balancing current flowing through the auxiliary winding AW1. Magnetizations of the transformer circuits T42 and T43 have similar features. In one embodiment, the auxiliary windings AW1, AW2 and AW3 are coupled to a common node 420 and operable for balancing the magnetizations M1, M2 and M3 by passing a signal, e.g., a current, among the auxiliary windings AW1, AW2 and AW3 via the common node 420.

In one embodiment, the ends of the auxiliary windings AW1, AW2 and AW3 coupled to the common node 420 have the same polarity. For example, if the common node 420 is coupled to the current limiting components R41, R42 and R43, e.g., via ground, such that the auxiliary winding AW1 and the current limiting component R41 constitute a current loop, the auxiliary winding AW2 and the current limiting component R42 constitute a current loop, and the auxiliary winding AW3 and the current limiting component R43 constitute a current loop, then when the primary windings PW1, PW2 and PW3 receive power from the power transfer circuitry 402, induced currents can be generated to flow through respective auxiliary windings AW1, AW2 and AW3 from respective first ends of the auxiliary windings AW1, AW2 and AW3 to respective second ends of the auxiliary windings AW1, AW2 and AW3. The first ends of the auxiliary windings AW1, AW2 and AW3 have "the same polarity" mentioned above, and the second ends of the auxiliary windings AW1, AW2 and AW3 also have "the same polarity." Taking FIG. 4 as an example, the ends of the auxiliary windings AW1, AW2 and AW3 coupled to the common node 420 are non-dotted terminals and have the same polarity.

In one embodiment, the common node 420 is not coupled to the current limiting components R41, R42 and R43 via ground. If the magnetizations M1, M2 and M3 in the transformer circuits T41, T42 and T43 are the same, e.g., the primary currents $I_{PW1}$, $I_{PW2}$ and $I_{PW3}$ flowing through the primary windings PW1, PW2 and PW3 are the same, then there may be no current generated to flow through the common node 420. It is because the auxiliary windings AW1, AW2 and AW3 may attempt to generate induced currents to flow through the common node 420, but theses currents have the same current levels and can be counteracted with one another at the common node 420. If the magnetization M1 is greater than the magnetizations M2 and M3, e.g., the primary current $I_{PW1}$ is greater than the primary currents $I_{PW2}$ and $I_{PW3}$, then the auxiliary winding AW1 can generate a balancing current $I_{AW1}$ to flow through the common node 420, a part of the balancing current $I_{AW1}$ can flow through the auxiliary winding AW2, and the other part of the balancing current $I_{AW1}$ can flow through the auxiliary winding AW3. In one embodiment, the balancing current $I_{AW1}$ flowing through the auxiliary winding AW1 can reduce the magnetization M1 of the transformer circuit T41, the part of the balancing current $I_{AW1}$ flowing through the auxiliary winding AW2 can increase the magnetization M2 of the transformer circuit T42, and the part of the balancing current $I_{AW1}$ flowing through the auxiliary winding AW3 can increase the magnetization M3 of the transformer circuit T43. Thus, the auxiliary windings AW1, AW2 and AW3 can transfer magnetic energy in a magnetic core of a transformer circuit T41, T42 or T43 having a larger magnetization to a magnetic core of another transformer circuit T41, T42 or T43 having a smaller magnetization. The auxiliary windings AW1, AW2 and AW3 can reduce differences between the magnetizations M1, M2 and M3 of the transformer circuits T41, T42 and T43 so as to balance the magnetizations M1, M2 and M3.

In the FIG. 4 embodiment, three transfer circuits (402_1, 402_2 and 402_3) and three transformer circuits (T41, T42 and T43) are disclosed, however, this invention is not so limited, and in other embodiments, two transformer circuits or more than three transformer circuits and corresponding transfer circuits can be applied using similar structures.

Advantageously, by using multiple transformer circuits, heat dissipation for the power conversion circuitry 404 can be improved, and the DC/DC converter 400 can endure larger input power/voltage with lower power loss and higher conversion efficiency, compared with the conventional DC/DC converter 100. Also, the magnetic energy stored at the magnetic cores of the transformer circuits T41, T42 and T43 can be balanced, which further enhances the power conversion efficiency of the DC/DC converter 400.

Figure 5A:
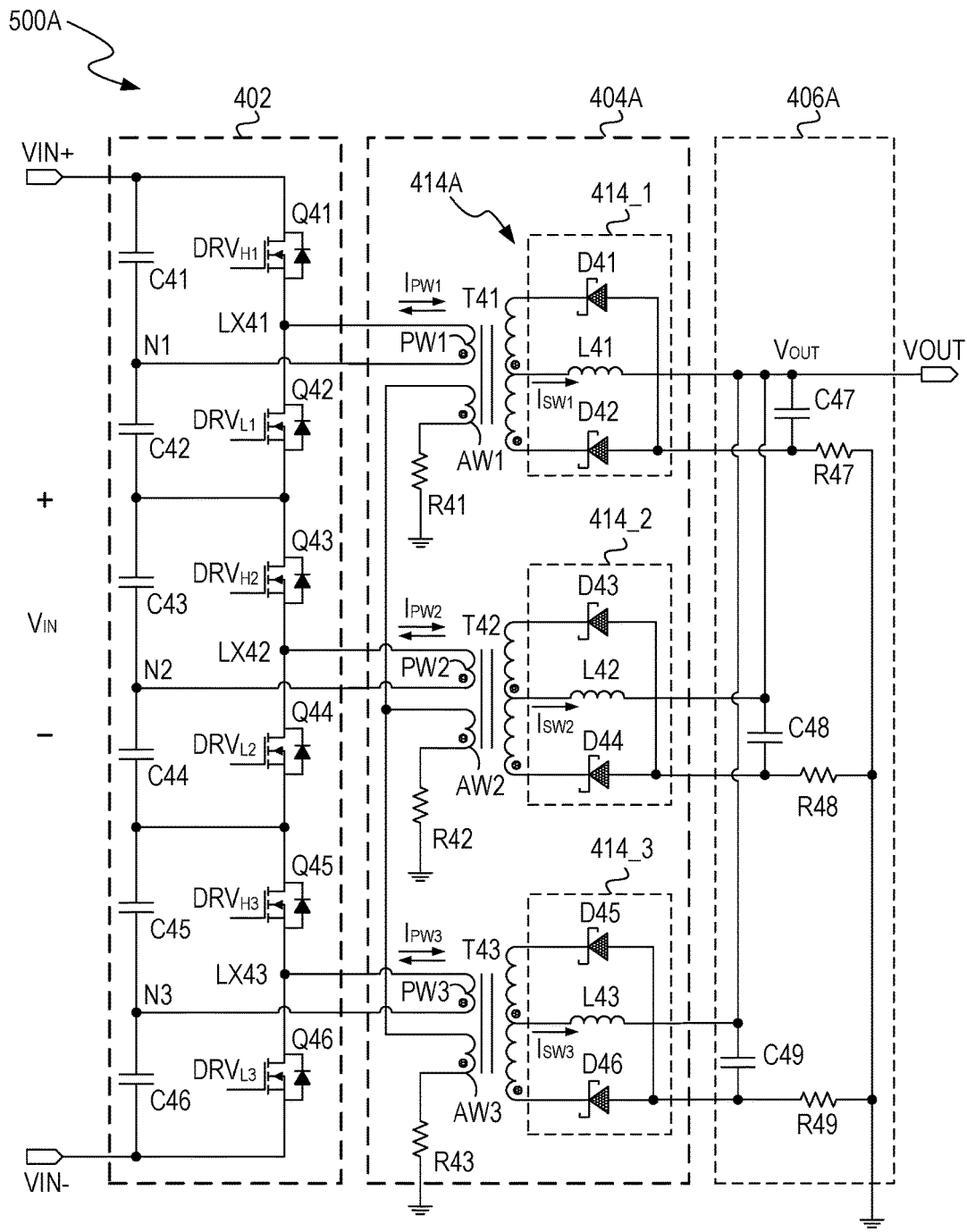
FIG. 5A illustrates a circuit diagram of an example of the power converter in FIG. 4, in an embodiment according to the present invention.

FIG. 5A illustrates a circuit diagram of an example of a DC/DC converter 500A, in an embodiment according to the present invention. FIG. 5A also shows examples of the power transfer circuitry 402 and the power conversion circuitry 404 in FIG. 4. FIG. 5A is described in combination with FIG. 2, FIG. 3 and FIG. 4. The DC/DC converter 500A can be one embodiment of the DC/DC converter 400 in FIG. 4.

In the example of FIG. 5A, the power transfer circuitry 402 includes capacitive components C41, C42, C43, C44, C45 and C46, e.g., capacitors, coupled in series to form capacitive voltage divider circuitry. The voltage divider circuitry can divide an input voltage $V_{IN}$ of the DC/DC converter 500A into a set of partial voltages $V_{C41}$, $V_{C42}$, $V_{C43}$, $V_{C44}$, $V_{C45}$ and $V_{C46}$. Each partial voltage of the partial voltages $V_{C41}$, $V_{C42}$, $V_{C43}$, $V_{C44}$, $V_{C45}$ and $V_{C46}$ corresponds to a voltage across a capacitive component of the capacitive components C41, C42, C43, C44, C45 and C46, respectively. For example, a voltage across the capacitive component C41 is the partial voltage $V_{C41}$, and a voltage across the capacitive component C44 is the partial voltage $V_{C44}$. The capacitive components C41, C42, C43, C44, C45 and C46 can have substantially the same capacitance, which means the capacitive components C41, C42, C43, C44, C45 and C46 can be manufactured to have the same capacitance, and negligible differences may exist between their capacitances because of non-ideality of the manufacturing process. Thus, in one embodiment, the partial voltages $V_{C41}$, $V_{C42}$, $V_{C43}$, $V_{C44}$, $V_{C45}$ and $V_{C46}$ have substantially the same values, e.g., one sixth of the total input voltage $V_{IN}$ of the DC/DC converter 500A. The power transfer circuitry 402 also includes switching circuitry, e.g., switches Q41, Q42, Q43, Q44, Q45 and Q46 forming multiple half-bridge switching circuits. The switching circuitry, e.g., Q41-Q46, can control each primary winding of the primary windings PW1, PW2 and PW3 to selectively receive a partial voltage of the partial voltages $V_{C41}$, $V_{C42}$, $V_{C43}$, $V_{C44}$, $V_{C45}$ and $V_{C46}$.

More specifically, in one embodiment, the voltage divider of capacitive components C41 and C42 and the half bridge switching circuit of switches Q41 and Q42 constitute the transfer circuit 402_1 in FIG. 4, and can transfer a fraction of the total input power of the DC/DC converter 500A to the primary winding PW1. By way of example, if the switch Q41 is on, and the switch Q42 is off, then the primary winding PW1 is coupled in parallel with the capacitive component C41 to receive a partial voltage $V_{C41}$, and a primary current $I_{PW1}$ flows to the primary winding PW1 through the switch Q41; and if the switch Q41 is off, and the switch Q42 is on, then the primary winding PW1 is coupled in parallel with the capacitive component C42 to receive a partial voltage $V_{C42}$, and a primary current $I_{PW1}$ flows to the primary winding PW1 through the switch Q42. In addition, the control signals $DRV_{H1}$ and $DRV_{L1}$ can turn on and off the switches Q41 and Q42 alternately (e.g., when Q41 is on, Q42 is off, and vice versa) to transfer a fraction of the total input power to the primary winding PW1. Similarly, the voltage divider of capacitive components C43 and C44 and the half bridge switching circuit of switches Q43 and Q44 constitute the transfer circuit 402_2 in FIG. 4, and can transfer a fraction of the total input power of the DC/DC converter 500A to the primary winding PW2; and the voltage divider of capacitive components C45 and C46 and the half bridge switching circuit of switches Q45 and Q46 constitute the transfer circuit 402_3 in FIG. 4, and can transfer a fraction of the total input power of the DC/DC converter 500A to the primary winding PW3.

In one embodiment, the switching circuitry Q41-Q46, under control of the control signals $DRV_{H1}$, $DRV_{L1}$, $DRV_{H2}$, $DRV_{L2}$, $DRV_{H3}$ and $DRV_{L3}$, connects a primary winding of the primary windings PW1, PW2 and PW3 in series to a first capacitive component of the capacitive components C41, C42, C43, C44, C45 and C46 if the switching circuitry Q41-Q46 connects the primary winding in parallel with a second capacitive component adjacent to the first capacitive component, and connects the primary winding in series to the second capacitive component if the switching circuitry Q41-Q46 connects the primary winding in parallel with the first capacitive component. By way of example, if the switching circuitry Q41-Q46 connects the primary winding PW1 in parallel with the capacitive component C41, e.g., by turning on the switch Q41, then the switching circuitry Q41-Q46 connects the primary winding PW1 in series to the capacitive component C42, e.g., by turning off the switch Q42. If the switching circuitry Q41-Q46 connects the primary winding PW1 in parallel with the capacitive component C42, e.g., by turning off the switch Q42, then the switching circuitry Q41-Q46 connects the primary winding PW1 in series to the capacitive component C41, e.g., by turning on the switch Q41. In one embodiment, the control signals $DRV_{H1}$, $DRV_{L1}$, $DRV_{H2}$, $DRV_{L2}$, $DRV_{H3}$, and $DRV_{L3}$ alternately turn on the set of switches Q41, Q43 and Q45 and the set of switches Q42, Q44 and Q46. When the switches Q41, Q43 and Q45 are on, and the switches Q42, Q44 and Q46 are off, the primary windings PW1, PW2 and PW3 are coupled in parallel with the capacitive components C41, C43 and C45 respectively such that the primary windings PW1, PW2 and PW3 receive partial voltages $V_{C41}$, $V_{C43}$ and $V_{C45}$ from the capacitive components C41, C43 and C45. In addition, when the switches Q41, Q43 and Q45 are on, and the switches Q42, Q44 and Q46 are off, the capacitive components C42, C44 and C46 are coupled in series to the primary windings PW1, PW2 and PW3. Thus, advantageously, similar to the capacitive component C32 disclosed in FIG. 3, the capacitive components C42, C44 and C46 can avoid core saturation of the transformer circuits T41, T42 and T43. Also, when the switches Q41, Q43 and Q45 are off, and the switches Q42, Q44 and Q46 are on, the primary windings PW1, PW2 and PW3 are coupled in parallel with the capacitive components C42, C44 and C46 to receive partial voltages $V_{C42}$, $V_{C44}$ and $V_{C46}$, and the capacitive components C41, C43 and C45 are coupled in series to the primary windings of the transformer circuits T41, T42 and T43 and can avoid core saturation of the transformer circuits T41, T42 and T43.

In the power conversion circuitry 404A of FIG. 5A, the transformer circuits T41, T42 and T43 can have structure and functions similar to those of the transformer circuits T31 and T32 in FIG. 3, except that the transformer circuits T41, T42 and T43 also include auxiliary windings AW1, AW2 and AW3 for the purpose of the abovementioned balancing. That is, in one embodiment, the transformer circuits T41, T42 and T43 include multiple magnetic cores, multiple primary windings PW1, PW2 and PW3 magnetically coupled to the magnetic cores respectively, and multiple secondary windings, e.g., center-tapped secondary winding shown in FIG. 3, magnetically coupled to the magnetic cores respectively. The transformer circuits T41, T42 and T43 can also include balance circuitry, e.g., the auxiliary windings AW1, AW2 and AW3, magnetically coupled to the magnetic cores to balance magnetizations in the magnetic cores. The balance circuitry, e.g., the auxiliary windings AW1, AW2 and AW3, can also balance the partial voltages $V_{C41}$, $V_{C42}$, $V_{C43}$, $V_{C44}$, $V_{C45}$ and $V_{C46}$. By way of example, when the switches Q41, Q43 and Q45 are on, and the switches Q42, Q44 and Q46 are off, the primary windings PW1, PW2 and PW3 receive partial voltages $V_{C41}$, $V_{C43}$ and $V_{C45}$ from the capacitive components C41, C43 and C45. If the partial voltage $V_{C41}$ is greater than the partial voltages $V_{C43}$ and $V_{C45}$, then the primary winding PW1 can receive more power than the primary windings PW2 and PW3. Thus, the capacitive component C41 can discharge more power than the capacitive components C43 and C45, and the partial voltage $V_{C41}$ can decrease faster than the partial voltages $V_{C43}$ and $V_{C45}$. The auxiliary winding AW1 can transfer magnetic energy from the transformer circuit T41 to the transformer circuits T42 and T43. As a result, the magnetizations of the transformer circuits T41, T42 and T43 can be balanced, and the partial voltages $V_{C41}$, $V_{C43}$ and $V_{C45}$ can be balanced. In a similar manner, the partial voltages $V_{C42}$, $V_{C44}$ and $V_{C46}$ can be balanced.

In operation, in one embodiment, the control signals $DRV_{H1}$, $DRV_{L1}$, $DRV_{H2}$, $DRV_{L2}$, $DRV_{H3}$, and $DRV_{L3}$ control the switching circuitry, e.g., Q41-Q46, such that the power conversion circuitry 404A alternates among a first state, a second state, a third state, and a fourth state. In the first state, the power conversion circuitry 404A receives power from the capacitive components C41, C43 and C45, converts the power to magnetic energy in the magnetic cores of the transformer circuits T41, T42 and T43, and further converts a part of the magnetic energy to output power at the output circuit 406A. Additionally, the capacitive components C42, C44 and C46 can be used to avoid core saturation of the transformer circuits T41, T42 and T43. Taking FIG. 5A for example, in the first state, the control signals $DRV_{H1}$, $DRV_{L1}$, $DRV_{H2}$, $DRV_{L2}$, $DRV_{H3}$, and $DRV_{L3}$ turn on the switches Q41, Q43 and Q45 and turn off the switches Q42, Q44 and Q46. In the second state, the power conversion circuitry 404A does not receive power from the capacitive components C41, C42, C43, C44, C45 and C46, and converts the remaining part of the magnetic energy, e.g., stored in the first state, to output power at the output circuit 406A. Taking FIG. 5A for example, in the second state, the control signals $DRV_{H1}$, $DRV_{L1}$, $DRV_{H2}$, $DRV_{L2}$, $DRV_{H3}$, and $DRV_{L3}$ turn off the switches Q41, Q42, Q43, Q44, Q45 and Q46. In the third state, the power conversion circuitry 404A receives power from the capacitive components C42, C44 and C46, converts the power to magnetic energy in the magnetic cores of the transformer circuits T41, T42 and T43, and further converts a part of the magnetic energy to output power at the output circuit 406A. Additionally, the capacitive components C41, C43 and C45 can be used to avoid core saturation of the transformer circuits T41, T42 and T43. Taking FIG. 5A for example, in the third state, the control signals $DRV_{H1}$, $DRV_{L1}$, $DRV_{H2}$, $DRV_{L2}$, $DRV_{H3}$, and $DRV_{L3}$ turn on the switches Q42, Q44 and Q46 and turn off the switches Q41, Q43 and Q45. In the fourth state, the power conversion circuitry 404A does not receive power from the capacitive components C41, C42, C43, C44, C45 and C46, and converts the remaining part of the magnetic energy, e.g., stored in the third state, to output power at the output circuit 406A. As a result, the power conversion circuitry 404A can receive input power from the set of capacitive components C41, C43 and C45 and the set of capacitive components C42, C44 and C46 alternately, and convert the input power to output power at the output circuit 406A.

In one embodiment, the control signals $DRV_{H1}$, $DRV_{L1}$, $DRV_{H2}$, $DRV_{L2}$, $DRV_{H3}$, and $DRV_{L3}$ can control the length of a time interval for the first state, e.g., during which the switches Q41, Q43 and Q45 are on, and the length of a time interval for the third state, e.g., during which the switches Q42, Q44 and Q46 are on, to be approximately the same. Thus, the partial voltages $V_{C41}$, $V_{C42}$, $V_{C43}$, $V_{C44}$, $V_{C45}$ and $V_{C46}$ can be balanced with one another. As used herein, "approximately the same" means that the control signals $DRV_{H1}$, $DRV_{L1}$, $DRV_{H2}$, $DRV_{L2}$, $DRV_{H3}$, and $DRV_{L3}$ are programmed or adjusted to control the lengths of the two time intervals to be the same, and a difference between the two time intervals caused by, e.g., non-ideality of circuit components, is permissible as long as the difference is relatively small and can be neglected.

Moreover, rectifier circuitry 414A, e.g., an embodiment of the rectifier circuitry 414 in FIG. 4, can include rectifier circuits 414_1, 414_2 and 414_3. The rectifier circuits 414_1, 414_2 and 414_3 can have structure and functions similar to those of the rectifier circuits 314_1 and 314_2 in FIG. 3. In one embodiment, the power conversion circuitry 404A may further include balance circuits having one or more capacitive components coupled between the secondary windings of the transformer circuits T41, T42 and T43, in a similar manner as illustrated in FIG. 3. Additionally, the output circuit 406A of the DC/DC converter 500A can have structure and functions similar to those of the output circuit 306 in FIG. 3.

Thus, as discussed above, heat produced by the power conversion can be distributed on the transformer circuits T41, T42 and T43, and heat dissipation for the power conversion circuitry 404A can be improved. The magnetic energy stored in the magnetic cores of the transformer circuits T41, T42 and T43 can be balanced, and the partial voltages $V_{C41}$, $V_{C42}$, $V_{C43}$, $V_{C44}$, $V_{C45}$ and $V_{C46}$ of the capacitive components C41, C42, C43, C44, C45 and C46 can be balanced, which further enhances the power conversion efficiency of the DC/DC converter 500A. Additionally, in one embodiment, since the input voltage $V_{IN}$ of the DC/DC converter 500A is divided into multiple smaller voltages (e.g., partial voltages $V_{C41}$, $V_{C42}$, $V_{C43}$, $V_{C44}$, $V_{C45}$ and $V_{C46}$) that are applied to the switches (e.g., Q41, Q42, Q43, Q44, Q45 and Q46) of the power transfer circuitry 402, these switches can have a lower operating voltage and a lower on resistance $R_{DSON}$. These switches can have better switching performance compared with those which have a higher operating voltage and a higher on resistance $R_{DSON}$. Also, amplitudes of voltage changes at the switching nodes (e.g., LX41, LX42 and LX43) of the power transfer circuitry 402 caused by switching from a state to another state (e.g., among the abovementioned first, second, third and fourth states) can be reduced, compared with those in a power transfer circuitry that uses switches to sustain a relatively high voltage. Thus, even if the input voltage $V_{IN}$ of the DC/DC converter 500A is relatively high, radiation caused by switching of the switches Q41, Q42, Q43, Q44, Q45 and Q46 between different states (e.g., the first, second, third and fourth states) can be relatively small.

The half-bridge switching circuits disclosed in the power transfer circuitry 402 of FIG. 5A are examples for illustrative purposes, and another type of switching circuits such as full-bridge switching circuits can be applied in the power transfer circuitry 402 in other embodiments. For example, the power transfer circuitry 402 may include multiple capacitive components coupled in series to form voltage divider circuitry, and each capacitive component is coupled to a full-bridge circuit in a similar manner as disclosed in the power transfer circuitry 302 of FIG. 3.

Furthermore, the rectifier circuitry 414A disclosed in the power conversion circuitry 404A of FIG. 5A is an example for illustrative purposes, and other types of circuitry can be applied in the power conversion circuitry 404A.

Figure 5B:
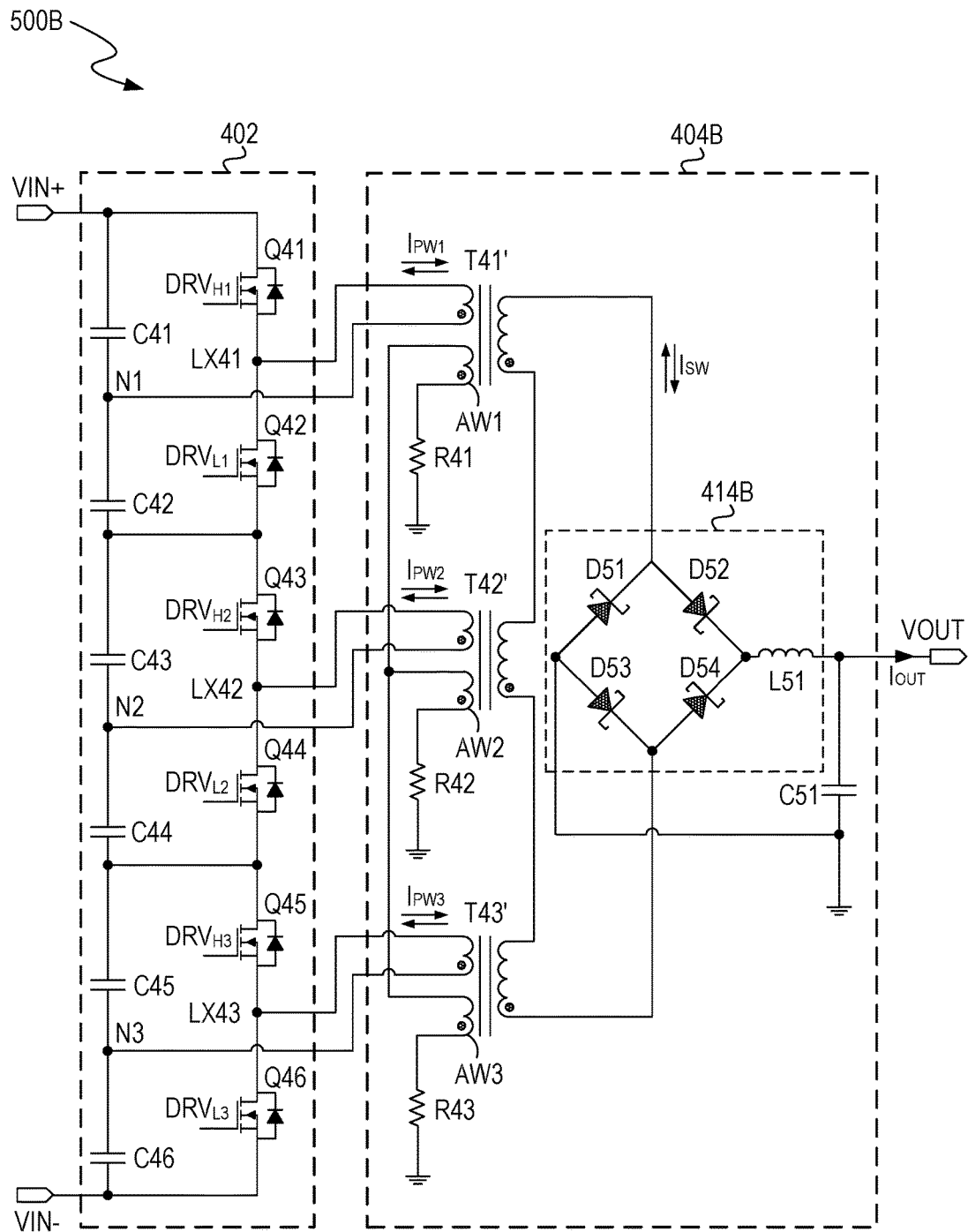
FIG. 5B illustrates a circuit diagram of an example of the power converter in FIG. 4, in another embodiment according to the present invention.

FIG. 5B illustrates a circuit diagram of an example of a DC/DC converter 500B, in another embodiment according to the present invention. FIG. 5B is described in combination with FIG. 2, FIG. 3, FIG. 4 and FIG. 5A. The DC/DC converter 500B can be one embodiment of the DC/DC converter 400 in FIG. 4.

In one embodiment, the DC/DC converter 500B has a structure similar to that of the DC/DC converter 500A, except that the secondary windings of the transformer circuits T41', T42' and T43' in FIG. 5B are coupled in series, and the power conversion circuitry 404B includes a full-bridge rectifier circuit 414B. The full-bridge rectifier circuit 414B can include diodes D51, D52, D53, D54, and an inductor L51, and can receive a secondary current flowing through the series-coupled secondary windings, and can generate a rectified output current $I_{OUT}$ at the output terminal VOUT.

Figure 6:
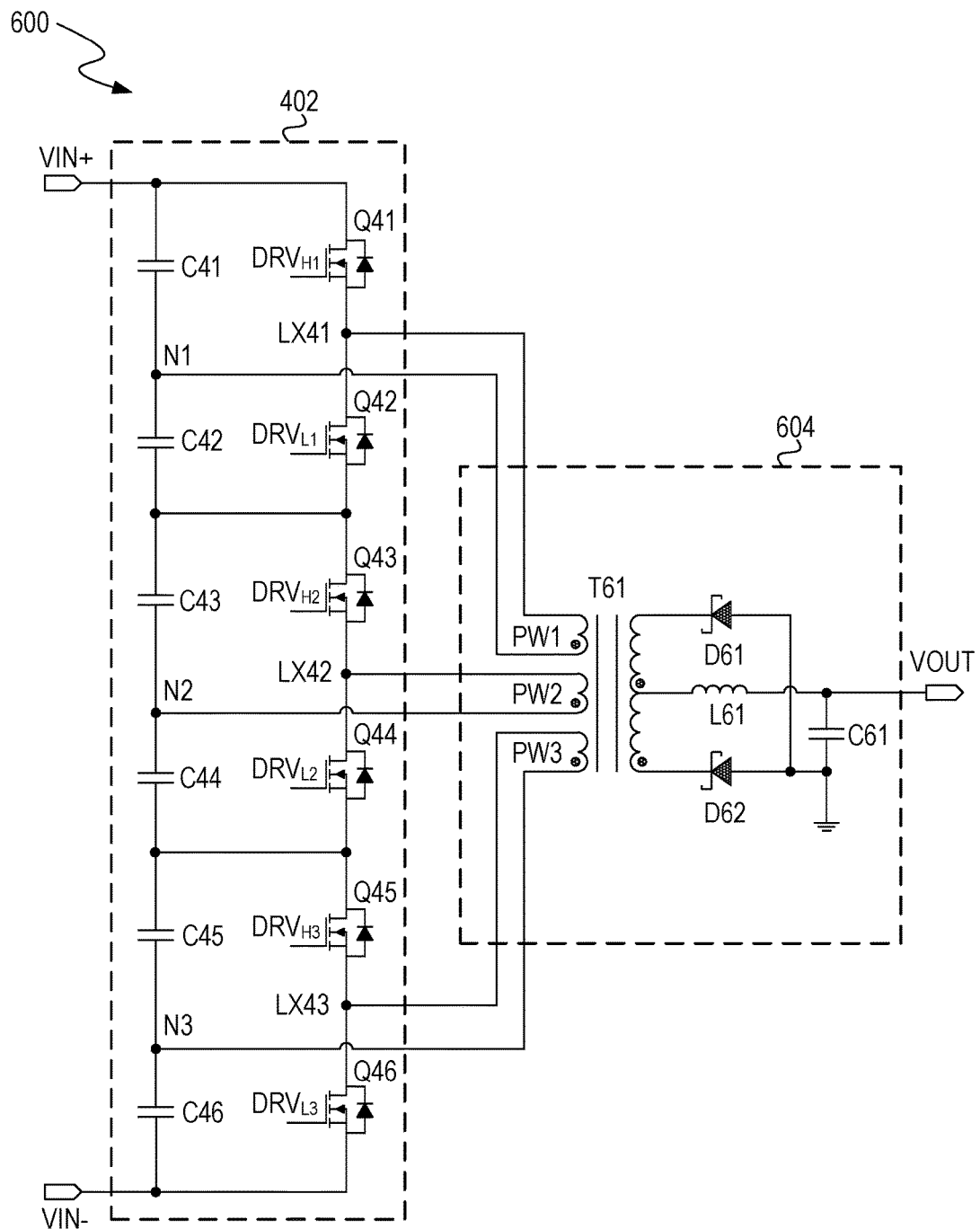
FIG. 6 illustrates a circuit diagram of an example of a power converter, in another embodiment according to the present invention.

FIG. 6 illustrates a circuit diagram of an example of a DC/DC converter 600, in another embodiment according to the present invention. FIG. 6 is described in combination with FIG. 2, FIG. 3, FIG. 4 and FIG. 5A. The DC/DC converter 600 includes power transfer circuitry 402 and power conversion circuitry 604.

The power transfer circuitry 402 in FIG. 6 can have a structure similar to that of the power transfer circuitry 402 in FIG. 5A. The controlling of the power transfer circuitry 402 in FIG. 6 can also be similar to that in FIG. 5A. The power conversion circuitry 604 includes a transformer circuit T61 and a rectifier circuit (e.g., having diodes D61 and D62, and an inductor L61). The transformer circuit T61 includes a magnetic core, primary windings PW1, PW2 and PW3 magnetically coupled to the magnetic core, and a secondary winding magnetically coupled to the magnetic core. The rectifier circuit has a structure similar to that of the rectifier circuit 314_1 disclosed in FIG. 3.

In one embodiment, the magnetic core of the transformer circuit T61 can provide negative feedback to balance the partial voltages $V_{C41}$, $V_{C42}$, $V_{C43}$, $V_{C44}$, $V_{C45}$ and $V_{C46}$ of the capacitive components C41, C42, C43, C44, C45 and C46 through the primary windings PW1, PW2 and PW3. For example, when the switches Q41, Q43 and Q45 are on, and the switches Q42, Q44 and Q46 are off, the primary windings PW1, PW2 and PW3 receive partial voltages $V_{C41}$, $V_{C43}$ and $V_{C45}$ from the capacitive components C41, C43 and C45. If the partial voltage $V_{C41}$ is greater than the partial voltages $V_{C43}$ and $V_{C45}$, then the magnetic core of the transformer circuit T61 can draw more power from the capacitive component C41 through the primary winding PW1 and draw less power from the capacitive components C43 and C45 through the primary windings PW2 and PW3, which causes the partial voltage $V_{C41}$ to decrease faster than the partial voltages $V_{C43}$ and $V_{C45}$. Thus, advantageously, the primary windings PW1, PW2 and PW3 can reduce differences between the partial voltages $V_{C41}$, $V_{C43}$ and $V_{C45}$ and therefore balance the partial voltages $V_{C41}$, $V_{C43}$ and $V_{C45}$. Similarly, the primary windings PW1, PW2 and PW3 can also reduce differences between the partial voltages $V_{C42}$, $V_{C44}$ and $V_{C46}$ and therefore balance the partial voltages $V_{C42}$, $V_{C44}$ and $V_{C46}$. Additionally, the control signals $DRV_{H1}$, $DRV_{L1}$, $DRV_{H2}$, $DRV_{L2}$, $DRV_{H3}$, and $DRV_{L3}$ can control the length of a first time interval during which the switches Q41, Q43 and Q45 are on and the length of a second time interval during which the switches Q42, Q44 and Q46 are on to be approximately the same. As a result, the partial voltages $V_{C41}$, $V_{C42}$, $V_{C43}$, $V_{C44}$, $V_{C45}$ and $V_{C46}$ can be balanced with one another. Moreover, in one embodiment, since a single magnetic core is used in the power conversion circuitry 604, the cost of the DC/DC converter 600 can be reduced.

Figure 7:
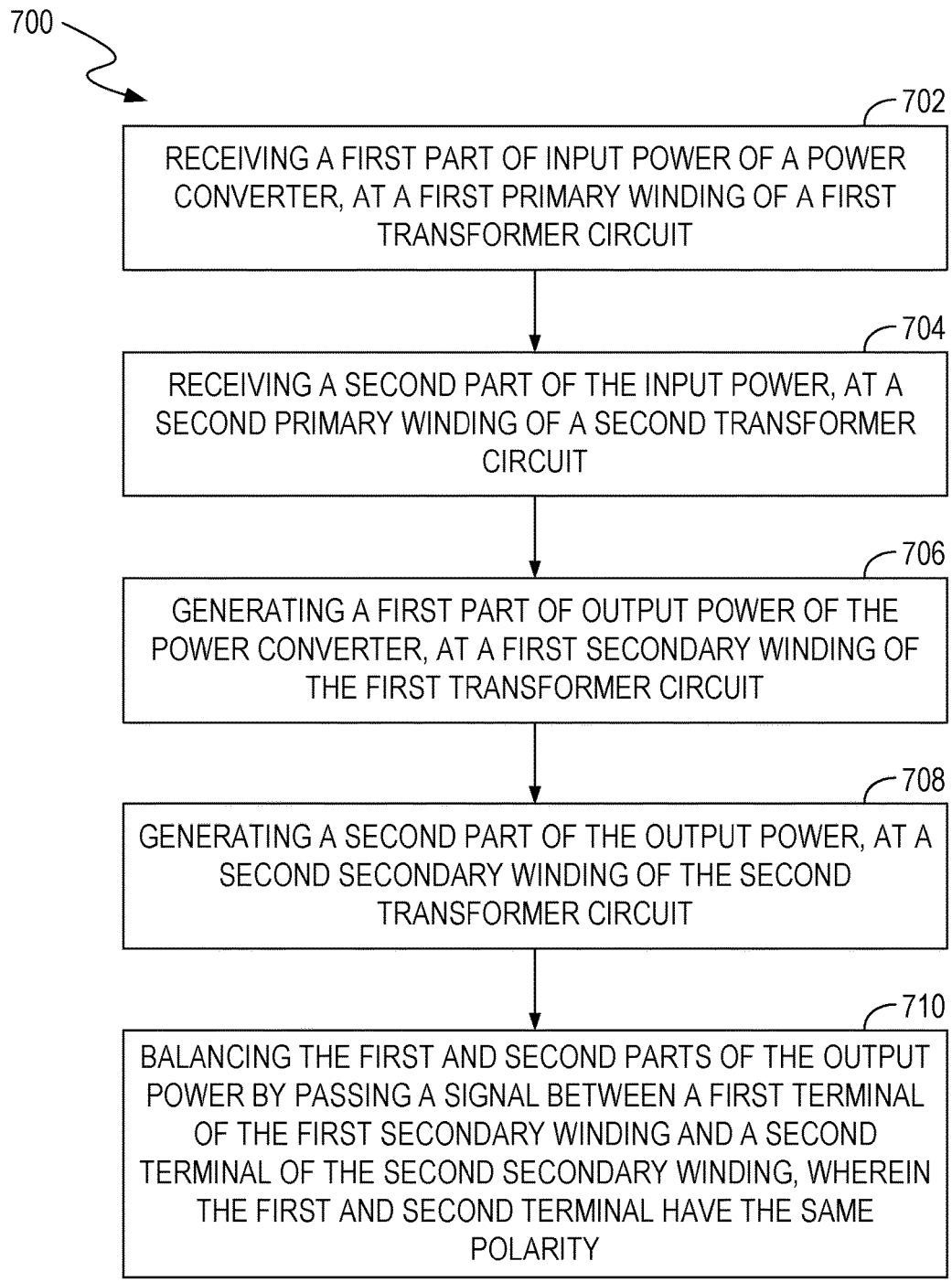
FIG. 7 illustrates a flowchart of examples of operations performed by a power converter, in an embodiment according to the present invention.

FIG. 7 illustrates a flowchart 700 of examples of operations performed by a power converter, in an embodiment according to the present invention. Although specific steps are disclosed in FIG. 7, such steps are examples for illustrative purposes. That is, embodiments according to the present invention are well suited to performing various other steps or variations of the steps recited in FIG. 7. FIG. 7 is described in combination with FIG. 2 and FIG. 3.

In block 702, a first primary winding of a first transformer circuit, e.g., the primary winding P1 of the transformer circuit T31 in FIG. 3, receives a first part of the input power of a power converter, e.g., the DC/DC converter 300.

In block 704, a second primary winding of a second transformer circuit, e.g., the primary winding P2 of the transformer circuit T32 in FIG. 3, receives a second part of the input power of the power converter, e.g., the DC/DC converter 300.

In block 706, a first secondary winding of the first transformer circuit, e.g., the secondary winding S1 of the transformer circuit T31, generates a first part of the output power of the power converter, e.g., the DC/DC converter 300.

In block 708, a second secondary winding of the second transformer circuit, e.g., the secondary winding S2 of the transformer circuit T32, generates a second part of the output power of the power converter, e.g., the DC/DC converter 300.

In block 710, a balance circuit, e.g., including capacitive components C35 and C36, balances the first and second part of the output power of the DC/DC converter 300 by passing a signal between a first terminal of the first secondary winding and a second terminal of the second secondary winding. The first and second terminals have the same polarity. For example, the capacitive components C35 and C36 balance the secondary currents $I_{S1}$ and $I_{S2}$ by passing voltage ringing between the terminals "1" and "3" and voltage ringing between the terminals "2" and "4." The terminals "1" and "3," e.g., non-dotted terminals, have the same polarity. Also, the terminals "2" and "4," e.g., dotted terminals, have the same polarity.

Figure 8:
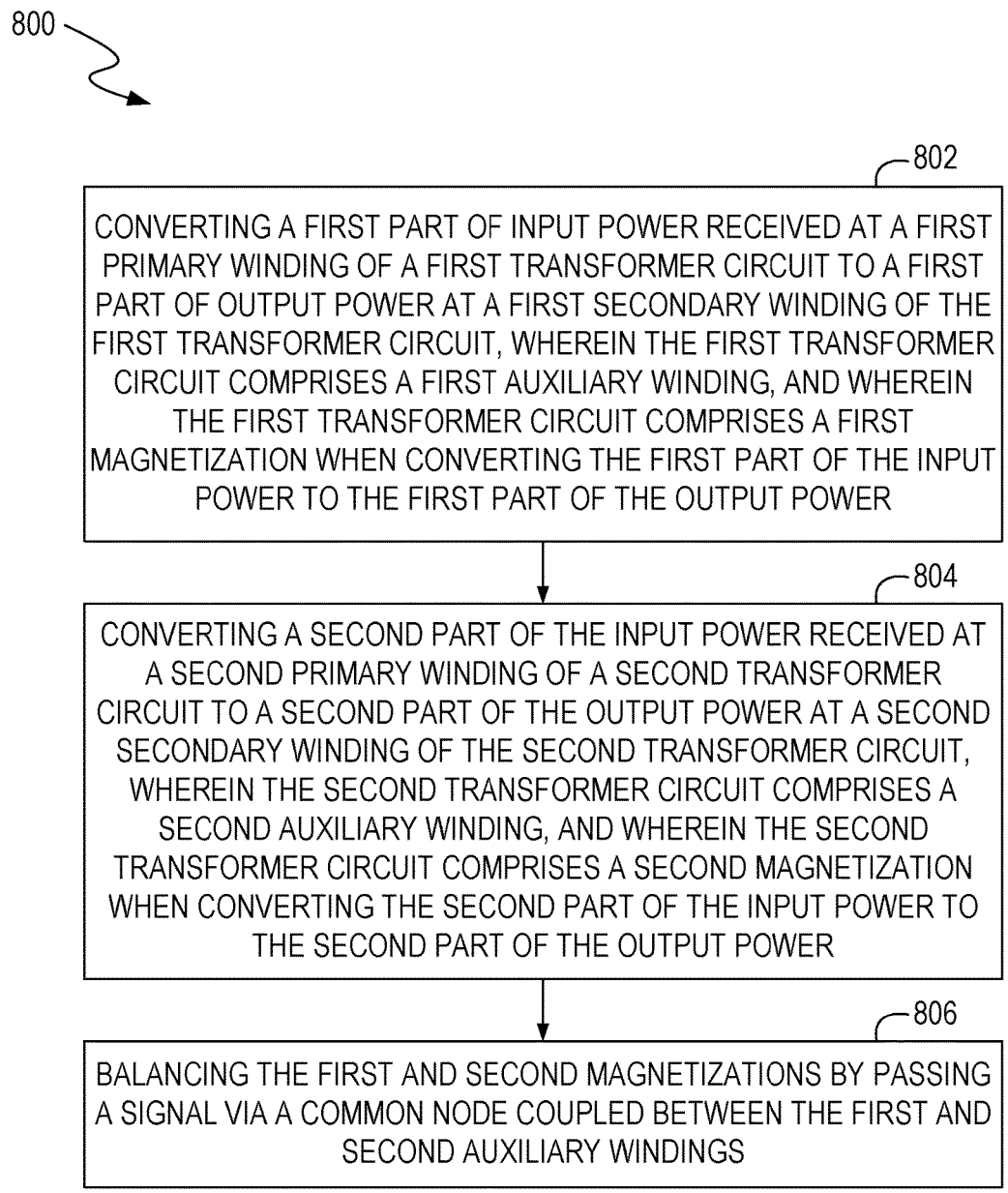
FIG. 8 illustrates a flowchart of examples of operations performed by a power converter, in an embodiment according to the present invention.

FIG. 8 illustrates a flowchart 800 of examples of operations performed by a power converter, in an embodiment according to the present invention. Although specific steps are disclosed in FIG. 8, such steps are examples for illustrative purposes. That is, embodiments according to the present invention are well suited to performing various other steps or variations of the steps recited in FIG. 8. FIG. 8 is described in combination with FIG. 4, FIG. 5A and FIG. 5B.

In block 802, a first transformer circuit, e.g., T41, converts a first part of the input power of a power converter, e.g., presented by a primary current $I_{PW1}$, received at a first primary winding, e.g., PW1, of the first transformer circuit, e.g., T41, to a first part of the output power of the power converter, e.g., represented by a secondary current $I_{SW1}$, at a first secondary winding, e.g., SW1, of the first transformer circuit, e.g., T41. The first transformer circuit, e.g., T41, includes the first primary winding, e.g., PW1, the first secondary winding, e.g., SW1, and also includes a first auxiliary winding, e.g., AW1. The first transformer circuit, e.g., T41, can have a first magnetization M1 when converting the first part of the input power, e.g., presented by the primary current $I_{PW1}$, to the first part of the output power, e.g., represented by the secondary current $I_{SW1}$.

In block 804, a second transformer circuit, e.g., T42, converts a second part of the input power, e.g., presented by a primary current $I_{PW2}$, received at a second primary winding, e.g., PW2, of the second transformer circuit, e.g., T42, to a second part of the output power, e.g., represented by a secondary current $I_{SW2}$, at a second secondary winding, e.g., SW2, of the second transformer circuit, e.g., T42. The second transformer circuit, e.g., T42, includes the second primary winding, e.g., PW2, the second secondary winding, e.g., SW2, and also includes a second auxiliary winding, e.g., AW2. The second transformer circuit, e.g., T42, can have a second magnetization M2 when converting the second part of the input power, e.g., presented by the primary current $I_{PW2}$, to the second part of the output power, e.g., represented by the secondary current $I_{SW2}$.

In block 806, the first and second auxiliary windings, e.g., AW1 and AW2, balance the first and second magnetizations M1 and M2 by passing a signal, e.g., a balancing current, via a common node, e.g., 420, coupled between the first and second auxiliary windings, e.g., AW1 and AW2.

Figure 9:
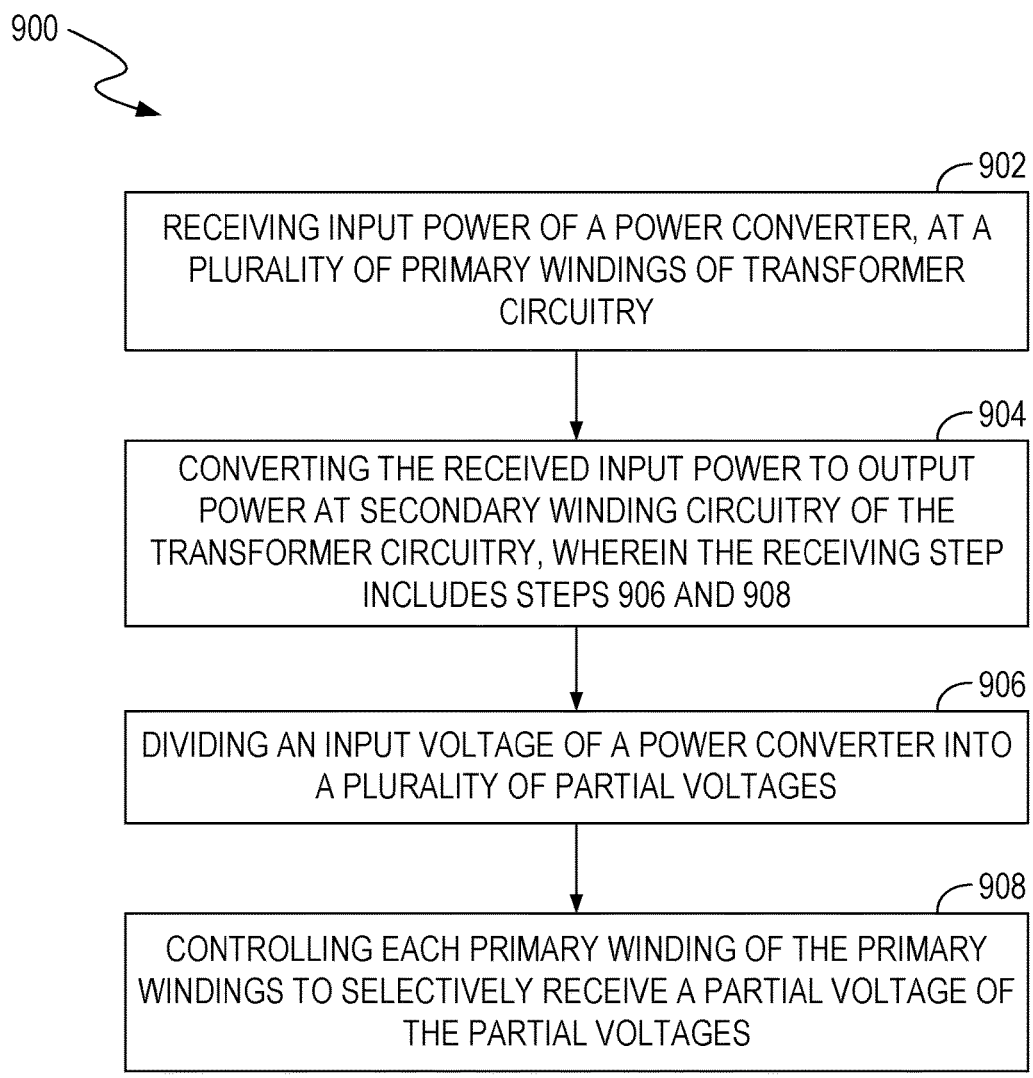
FIG. 9 illustrates a flowchart of examples of operations performed by a power converter, in an embodiment according to the present invention.

FIG. 9 illustrates a flowchart 900 of examples of operations performed by a power converter, in an embodiment according to the present invention. Although specific steps are disclosed in FIG. 9, such steps are examples for illustrative purposes. That is, embodiments according to the present invention are well suited to performing various other steps or variations of the steps recited in FIG. 9. FIG. 9 is described in combination with FIG. 5A, FIG. 5B and FIG. 6.

In block 902, a set of primary windings, e.g., PW1, PW2 and PW3, of transformer circuitry, e.g., the transformer circuits T41, T42 and T43 in FIG. 5A, the transformer circuits T41', T42' and T43' in FIG. 5B, or the transformer circuit T61 in FIG. 6, receive input power of a power converter, e.g., 500A, 500B, or 600.

In block 904, the transformer circuitry converts the received input power to an output power at secondary winding circuitry of the transformer circuitry, e.g., the transformer circuits T41, T42 and T43 in FIG. 5A, the transformer circuits T41', T42' and T43' in FIG. 5B, or the transformer circuit T61.

In one embodiment, the receiving of the input power mentioned in block 902 includes steps disclosed in blocks 906 and 908. In block 906, voltage divider circuitry, e.g., including capacitive components C41, C42, C43, C44, C45 and C46 in FIG. 5A, FIG. 5B or FIG. 6, divides an input voltage $V_{IN}$ of the power converter, e.g., 500A, 500B, or 600, into a set of partial voltages, e.g., $V_{C41}$, $V_{C42}$, $V_{C43}$, $V_{C44}$, $V_{C45}$ and $V_{C46}$.

In block 908, switching circuitry, e.g., including switches Q41, Q42, Q43, Q44, Q45 and Q46 in FIG. 5A, FIG. 5B or FIG. 6, controls each primary winding of the primary windings, e.g., PW1, PW2 and PW3, to selectively receive a partial voltage of the partial voltages, e.g., $V_{C41}$, $V_{C42}$, $V_{C43}$, $V_{C44}$, $V_{C45}$ and $V_{C46}$.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A power converter comprising:
a first primary winding;
a first secondary winding magnetically coupled to said first primary winding;
a second primary winding coupled to said first primary winding;
a second secondary winding magnetically coupled to said second primary winding;
a first diode, coupled to said first secondary winding, that allows a first current to flow through said first secondary winding to an output terminal of said power converter when said first diode is turned on;
a second diode, coupled to said second secondary winding, that allows a second current to flow through said second secondary winding to said output terminal when said second diode is turned on; and
output circuitry that suppresses imbalance between said first and second currents,
wherein said output circuitry comprises a first resistive component, coupled to said first diode and said output terminal, that passes at least a part of said first current to provide negative feedback to said first current, and wherein said negative feedback circuitry further comprises a second resistive component, coupled to said second diode and said output terminal, that passes at least a part of said second current to provide negative feedback to said second current.

2. The power converter of claim 1, wherein said first secondary winding comprises a first upper section coupled to said first diode, and comprises a first lower section coupled to a third diode, wherein said second secondary winding comprises a second upper section coupled to said second diode, and comprises a second lower section coupled to a fourth diode.

3. The power converter of claim 2, wherein said first diode allows said first current to flow through said first upper section to said output terminal when said first diode is turned on, said second diode allows said second current to flow through said second upper section to said output terminal when said second diode is turned on, said third diode allows a third current to flow through said first lower section to said output terminal when said third diode is turned on, and said fourth diode allows a fourth current to flow through said second lower section to said output terminal when said fourth diode is turned on.

4. The power converter of claim 3, wherein said first resistive component is further coupled to said third diode and passes at least a part of said third current to provide negative feedback to said third current, and wherein said second resistive component is further coupled to said fourth diode and passes at least a part of said fourth current to provide negative feedback to said fourth current.

5. The power converter of claim 3, further comprising:
a first capacitive component, coupled between said first upper section and said second upper section, that passes a signal between said first and second upper sections to balance said first and second currents; and
a second capacitive component, coupled between said first lower section and said second lower section, that passes a signal between said first and second lower sections to balance said third and fourth currents.

6. The power converter of claim 2, further comprising:
a first inductor coupled between said output terminal and a connection node of said first upper section and said first lower section;
a second inductor coupled between said output terminal and a connection node of said second upper section and said second lower section; and
a switching circuit, coupled to said first and second primary windings, that selectively transfers input power to circuitry including said first and second primary windings, thereby controlling said first and second inductors to control said first and second currents.

7. The power converter of claim 1, further comprising:
balance circuitry, coupled between said first and second secondary windings, that passes a signal between said first and second secondary windings to reduce a difference between voltage ringing on said first secondary winding and voltage ringing on said second secondary winding.

8. The power converter of claim 1, further comprising:
a capacitor, coupled in series to said first and second primary windings, that avoids core saturation of a first transformer circuit and a second transformer circuit, wherein said first transformer circuit comprises said first primary winding, and said second transformer circuit comprises said second primary winding.

9. A DC/DC converter comprising:
a first transformer circuit;
a second transformer circuit coupled to said first transformer circuit;
a plurality of switches, coupled to said first and second transformer circuits, that selectively transfer input power to said first and second transformer circuits, thereby controlling said first transformer circuit to generate a first current and controlling said second transformer circuit to generate a second current;
a first diode, coupled to a first secondary winding of said first transformer circuit, that allows said first current to flow through said first secondary winding to an output terminal of said power converter when said first diode is turned on;
a second diode, coupled to a second secondary winding of said second transformer circuit, that allows said second current to flow through said second secondary winding to said output terminal when said second diode is turned on; and
output circuitry that suppresses imbalance between said first and second currents,
wherein said output circuitry comprises a first resistive component, coupled to said first diode and said output terminal, that passes at least a part of said first current to provide negative feedback to said first current, and wherein said output circuitry further comprises a second resistive component, coupled to said second diode and said output terminal, that passes at least a part of said second current to provide negative feedback to said second current.

10. The DC/DC converter of claim 9, wherein said first secondary winding comprises a first upper section coupled to said first diode, and comprises a first lower section coupled to a third diode, wherein said second secondary winding comprises a second upper section coupled to said second diode, and comprises a second lower section coupled to a fourth diode.

11. The DC/DC converter of claim 10, wherein said first diode allows said first current to flow through said first upper section to said output terminal when said first diode is turned on, said second diode allows said second current to flow through said second upper section to said output terminal when said second diode is turned on, said third diode allows a third current to flow through said first lower section to said output terminal when said third diode is turned on, and said fourth diode allows a fourth current to flow through said second lower section to said output terminal when said fourth diode is turned on.

12. The DC/DC converter of claim 11, wherein said first resistive component is coupled to said third diode and passes at least a part of said third current to provide negative feedback to said third current, and wherein said second resistive component is coupled to said fourth diode and passes at least a part of said fourth current to provide negative feedback to said fourth current.

13. The DC/DC converter of claim 11, further comprising:
a first capacitive component, coupled between said first upper section and said second upper section, that passes a signal between said first and second upper sections to balance said first and second currents; and
a second capacitive component, coupled between said first lower section and said second lower section, that passes a signal between said first and second lower sections to balance said third and fourth currents.

14. The DC/DC converter of claim 10, further comprising:
a first inductor coupled between said output terminal and a connection node of said first upper section and said first lower section; and
a second inductor coupled between said output terminal and a connection node of said second upper section and said second lower section,
wherein said switches selectively transfer input power to circuitry including said first and second transformer circuits, thereby controlling said first and second inductors to control said first and second currents.

15. The DC/DC converter of claim 9, further comprising:
balance circuitry, coupled between said first and second secondary windings, that passes a signal between said first and second secondary windings to reduce a difference between voltage ringing on said first secondary winding and voltage ringing on said second secondary winding.

16. The DC/DC converter of claim 9, further comprising:
a capacitor, coupled in series to a first primary winding of said first transformer circuit and a second primary winding of said second transformer circuit, that avoids core saturation of said first and second transformer circuits.

17. A method for balancing outputs of a power converter, said method comprising:
selectively transferring input power to circuitry including a first transformer circuit and a second transformer circuit coupled to said first transformer circuit;
controlling said first and second transformer circuits to generate a first current and a second current by said selectively transferring said input power;

allowing, using a first diode coupled to a first secondary winding of said first transformer circuit, said first current to flow through said first secondary winding to an output terminal of said power converter;

allowing, using a second diode coupled to a second secondary winding of said second transformer circuit, said second current to flow through said second secondary winding to said output terminal; and suppressing imbalance between said first and second currents, wherein said suppressing said imbalance comprises:

controlling at least a part of said first current to flow through a first resistive component, coupled to said first diode and said output terminal, to provide negative feedback to said first current; and controlling at least a part of said second current to flow through a second resistive component, coupled to said second diode and said output terminal, to provide negative feedback to said second current.

18. The method of claim 17, wherein said first secondary winding comprises a first upper section coupled to said first diode, and a first lower section coupled to a third diode, wherein said second secondary winding comprises a second upper section coupled to said second diode, and a second lower section coupled to a fourth diode, and wherein said method further comprises:

allowing, using said first diode, said first current to flow through said first upper section to said output terminal;

allowing, using said second diode, said second current to flow through said second upper section to said output terminal;

allowing, using said third diode, a third current to flow through said first lower section to said output terminal; and allowing, using said fourth diode, a fourth current to flow through said second lower section to said output terminal.

19. The method of claim 18, further comprising suppressing imbalance between said third and fourth currents, wherein said suppressing said imbalance between said third and fourth currents comprises:

controlling at least a part of said third current to flow through said first resistive component to provide negative feedback to said third current; and controlling at least a part of said fourth current to flow through said second resistive component to provide negative feedback to said fourth current.

20. The method of claim 18, further comprising:

passing, using a first capacitive component, a signal between said first upper section and said second upper section to balance said first and second currents; and passing, using a second capacitive component, a signal between said first lower section and said second lower section to balance said third and fourth currents.

* * * * *